(12) United States Patent
Takahashi et al.

(10) Patent No.: US 10,120,471 B2
(45) Date of Patent: Nov. 6, 2018

(54) OPERATION DISPLAY APPARATUS, OPERATION DISPLAY METHOD AND TANGIBLE COMPUTER-READABLE RECORDING MEDIUM

(71) Applicant: Konica Minolta, Inc., Chiyoda-ku (JP)

(72) Inventors: Masao Takahashi, Hachioji (JP); Yasuaki Sugimoto, Hachioji (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 1147 days.

(21) Appl. No.: 13/863,853

(22) Filed: Apr. 16, 2013

(65) Prior Publication Data

US 2013/0285954 A1 Oct. 31, 2013

(30) Foreign Application Priority Data

Apr. 25, 2012 (JP) .................................. 2012-099552

(51) Int. Cl.
*G06F 3/041* (2006.01)
*G06F 3/0488* (2013.01)
(Continued)

(52) U.S. Cl.
CPC .......... *G06F 3/0412* (2013.01); *G06F 1/3265* (2013.01); *G06F 3/0488* (2013.01);
(Continued)

(58) Field of Classification Search
CPC ................................ G06F 3/041–3/047; G06F 2203/0401–2203/04113; G06F 1/1647–1/165; G09G 2300/02–2300/026
(Continued)

(56) References Cited

U.S. PATENT DOCUMENTS

| | | | |
|---|---|---|---|
| 6,469,695 B1 * | 10/2002 | White | G06F 3/0488 178/18.01 |
| 8,125,456 B2 * | 2/2012 | Krah | G06F 1/3203 178/18.01 |

(Continued)

FOREIGN PATENT DOCUMENTS

| | | |
|---|---|---|
| JP | 9-319337 A | 12/1997 |
| JP | 2000-039964 A | 2/2000 |

(Continued)

OTHER PUBLICATIONS

Office Action (Notice of Reason for Refusal) dated May 7, 2014, by the Japanese Patent Office in corresponding Japanese Patent Application No. 2012-099552 and an English translation of the Office Action. (10 pages).

(Continued)

*Primary Examiner* — Joseph Haley
*Assistant Examiner* — Emily Frank
(74) *Attorney, Agent, or Firm* — Buchanan Ingersoll & Rooney PC

(57) ABSTRACT

Disclosed in an operation display apparatus including: a display unit; a touch panel to detect a touch position on which a display face of the display unit is touched; and a control unit to control display contents of the display unit and to switch a specific area provided in a part of the display face, between an operable state in which display of information and a detection of a touch action for the touch panel are operated and a non-operable state in which the display and the detection are not operated, wherein the control unit sets a part of the specific area, which is arranged in a boundary with another operation display apparatus disposed with the operation display apparatus side by side, to the operable state.

19 Claims, 24 Drawing Sheets

(51) Int. Cl.
*G06F 1/32* (2006.01)
*G06F 3/14* (2006.01)

(52) U.S. Cl.
CPC .. *G06F 3/1446* (2013.01); *G06F 2203/04803* (2013.01); *Y02D 10/153* (2018.01); *Y02D 50/20* (2018.01)

(58) Field of Classification Search
USPC ..... 345/173–178, 1.1–3.4; 178/18.01–18.09, 178/18.11
See application file for complete search history.

(56) References Cited

U.S. PATENT DOCUMENTS

| | | | | |
|---|---|---|---|---|
| 8,988,313 | B2* | 3/2015 | Takishita | G06F 3/1446 345/1.3 |
| 9,009,984 | B2* | 4/2015 | Caskey | G06F 1/1616 33/303 |
| 9,454,186 | B2* | 9/2016 | Rasmussen | G06F 1/1643 |
| 2003/0021492 | A1* | 1/2003 | Matsuoka | G06F 3/0426 382/295 |
| 2009/0262078 | A1* | 10/2009 | Pizzi | G06F 1/1626 345/169 |
| 2010/0214278 | A1 | 8/2010 | Miura | |
| 2011/0039508 | A1* | 2/2011 | Lindahl | G06F 1/3203 455/230 |
| 2011/0261074 | A1* | 10/2011 | Sasama | G06F 1/3215 345/634 |
| 2012/0032972 | A1* | 2/2012 | Hwang | G06F 3/0488 345/592 |
| 2012/0047380 | A1* | 2/2012 | Nurmi | G06F 1/3203 713/320 |
| 2012/0068948 | A1* | 3/2012 | Tomoda | G06F 3/04886 345/173 |
| 2012/0092265 | A1* | 4/2012 | Williams | G06Q 10/08 345/169 |
| 2012/0218216 | A1* | 8/2012 | Tomimori | G06F 3/0483 345/173 |
| 2013/0021266 | A1* | 1/2013 | Selim | G06F 3/0487 345/173 |

FOREIGN PATENT DOCUMENTS

| | | | |
|---|---|---|---|
| JP | 2002-297316 | A | 10/2002 |
| JP | 2009-032184 | A | 2/2009 |
| JP | 2011-028603 | A | 2/2011 |
| JP | 2011-048431 | A | 3/2011 |
| JP | 2012-008923 | A | 1/2012 |
| JP | 2012-014648 | A | 1/2012 |
| JP | 2012-248137 | A | 12/2012 |
| JP | 2013058782 | A * | 3/2013 |

OTHER PUBLICATIONS

Office Action (Notice of Reason for Refusal) dated Aug. 13, 2014, by the Japan Patent Office in corresponding Japanese Patent Application No. 2012-099552, and an English Translation of the Office Action. (15 pages).

* cited by examiner

FIG.16

| SWITCHING FACTOR | | VALUE | PRIORITY ORDER |
|---|---|---|---|
| PROXIMITY SENSOR | ON FACTOR | 1 | 4 |
| | OFF FACTOR | 0 | |
| LOAD SENSOR | ON FACTOR | 1 | 3 |
| | OFF FACTOR | 0 | |
| SWITCHING OPERATION | ON FACTOR | 0 | 5 |
| | OFF FACTOR | 0 | |
| RESIDUAL QUANTITY OF BATTERY | ON FACTOR | 0 | 2 |
| | OFF FACTOR | 0 | |
| POWER SAVING MODE | ON FACTOR | 0 | 1 |
| | OFF FACTOR | 0 | |

OPERATION DISPLAY APPARATUS, OPERATION DISPLAY METHOD AND TANGIBLE COMPUTER-READABLE RECORDING MEDIUM

BACKGROUND OF THE INVENTION

Field of the Invention

The present invention relates to an operation display apparatus comprising a touch panel on a display face thereof, an operation display method and a tangible computer-readable recording medium.

Description of Related Art

A portable information processing terminal that comprises a display unit having an approximately B5 size (182 mm×257 mm) and a touch panel on the display face of the display unit is often operated while the terminal is held by a user's hand. As a general way of preventing erroneous detection caused by recognizing a touch action for holding the terminal with fingers of the holding hand as a touch action for inputting a normal operation, the following structure has been adopted. In the structure, a frame unit having a width of several centimeters is provided on the circumferential edge of the main body, and a touch panel type of display face is provided only on the inner side of the frame.

However, when the frame is provided, the display area is narrowed by the area of the frame, as compared with the size of a terminal.

For this reason, in order to provide the touch panel at portions to be held by a user' hand, the following information input apparatus has been proposed. In the information input apparatus, a part of the touch panel is set to an input non-operable area, and an object displayed on the display window is rearranged as to avoid the input non-operable area (see Patent Document 1: Japanese Unexamined Patent Application No. 2012-014648).

There has been another technology in which a second detection area surrounding a first detection area corresponding to an operable display area is provided, and when the touch action is detected on the second detection area, the detection of the touch action for the first detection area in the vicinity of the second detection area is not operated (for example, see Patent Document 2: Japanese Unexamined Patent Application No. 2012-008923). In this technology, when the contact with the fingers of the holding hand spreads from the second detection area to the first detection area, the erroneous detection is prevented in the first detection area touched by the fingers. The second detection area serves as a touch area for preventing the erroneous detection, and is not used for a normal input.

Further, when a large display area is obtained by disposing a plurality of display apparatuses having the frame side by side, the frame arranged in the joint of the display apparatuses causes the discontinuity between the images displayed on the display apparatuses, such as an oblique line. Accordingly, there has been a display apparatus that secures the continuity between images by deleting a part of the images, which corresponds to the frame, on the assumption that the frame exists around the joint (see Patent Document 3: Japanese Unexamined Patent Application No. H9-319337). Further, there has been an image display system in which the relative positions of a plurality of display apparatuses to be linked are specified, and the image displayed by each display apparatus is obtained so as to display the image completed at the relative positions (see Patent Document 4: Japanese Unexamined Patent Application No. 2011-48431).

In the method of merely setting a part of the touch panel to an area where the detection of the touch action is not operated, it is not possible to visually recognize which area is a non-operable area where the detection of the touch action is not operated. When the intended touch action is ignored, a user could be confused. Further, when a display apparatus is disposed and used on the desk or the like without being held by the user's hand, the area where the detection of the touch action is not operated is useless. Therefore, it is not possible to efficiently utilize the above area.

With respect to the problem caused in case that the plurality of apparatuses are used by disposing them side by side, in the technologies disclosed in the Patent Documents 2 and 3, it is possible to prevent the discontinuity between the images. However, because the frame exists in the display image like a thick line, there is still a problem in which the image is interrupted in the frame. Therefore, there is difficulty in viewing the image.

SUMMARY

To achieve at least one of the abovementioned objects, an operation display apparatus reflecting one aspect of the present invention comprises:

a display unit;

a touch panel to detect a touch position on which a display face of the display unit is touched; and a control unit to control display contents of the display unit and to switch a specific area provided in a part of the display face, between an operable state in which display of information and a detection of a touch action for the touch panel are operated and a non-operable state in which the display and the detection are not operated, wherein the control unit sets apart of the specific area, which is arranged in a boundary with another operation display apparatus disposed with the operation display apparatus side by side, to the operable state.

Preferably, the operation display apparatus further comprises a proximity sensor to detect a range in which the operation display apparatus is in contact with or in close proximity to the another operation display apparatus disposed side by side, wherein the control unit sets a part of the specific area, which corresponds to the range detected by the proximity sensor, to the operable state.

Preferably, in a portion in which a frame having not less than a predetermined width is not provided in an outer side of an end edge of the display face of the display unit, the specific area is provided along the end edge of the display face.

Preferably, the specific area is provided along an end edge of the display face so as to surround a central portion of the display face.

Preferably, the operation display apparatus further comprises a holding hand detecting unit to detect whether the operation display apparatus is held by a user's hand, wherein when the holding hand detecting unit detects that the operation display apparatus is held by the user's hand, the control unit sets the specific area to the non-operable state.

Preferably, the control unit switches the specific area between the operable state and the non-operable state, in accordance with a user's instruction.

Preferably, when a power mode of the operation display apparatus is a power saving mode, the control unit sets the specific area to the non-operable state.

Preferably, when residual quantity of a battery to supply electric power to the operation display apparatus is lower than a predetermined amount, the control unit sets the specific area to the non-operable state.

Preferably, in a situation in which the control unit sets the specific area to the non-operable state, when an instruction for setting a remaining area of the display face except the specific area to the non-operable state is received from a user, the control unit turns off the operation display apparatus or sets the operation display apparatus to a standby mode in which the display of the information, which is performed by the display unit is turned off.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein:

FIG. 16 is a view showing one example of the frame switching factor table;

DETAILED DESCRIPTION OF PREFERRED EMBODIMENT

Hereinafter, a preferred embodiment of the present invention will be explained with reference to the accompanying drawings.

Figure 1:
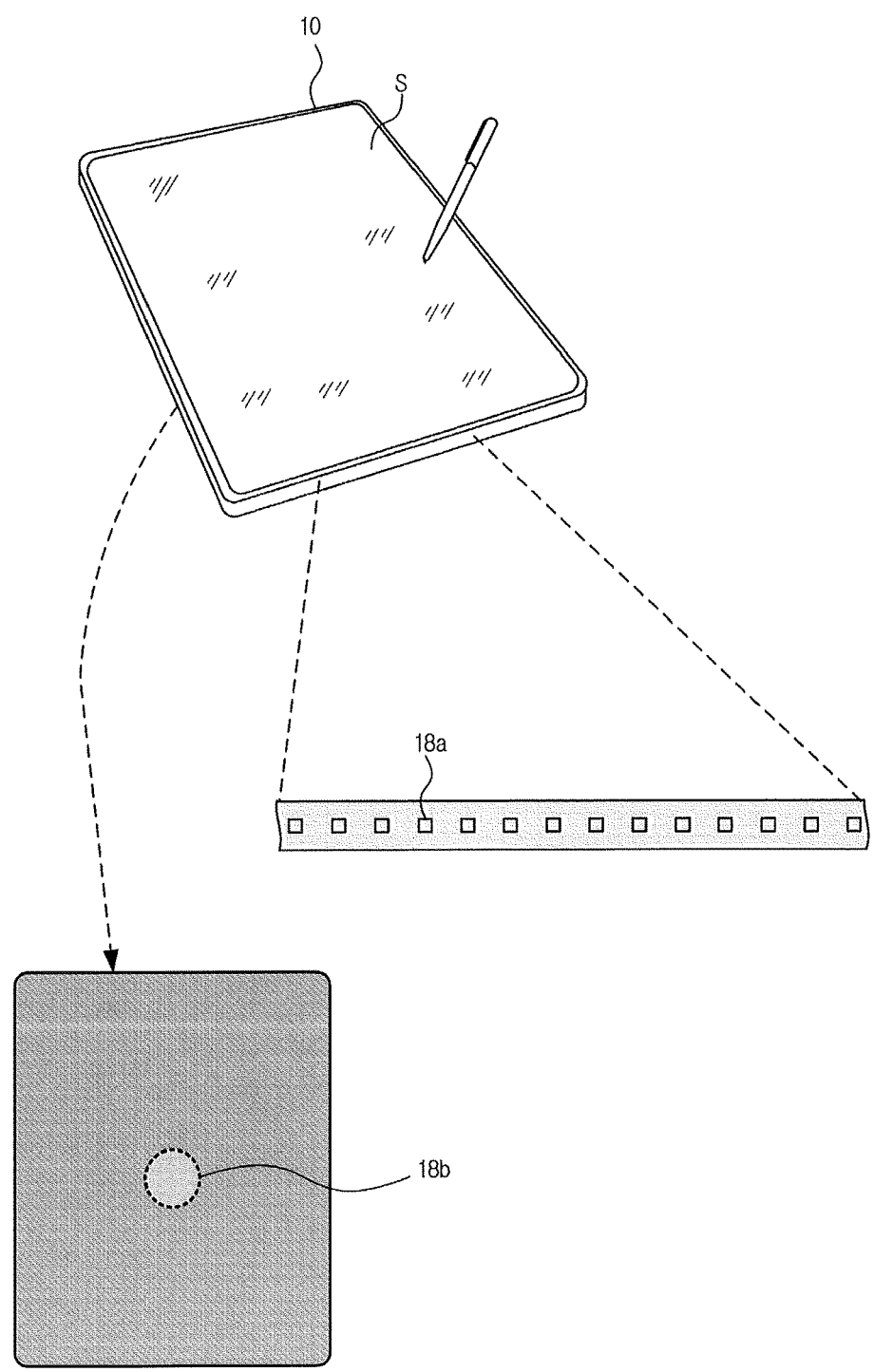
FIG. 1 is an explanatory view showing the external appearance of an information processing terminal according to the embodiment.

FIG. 1 shows the external appearance of an information processing terminal 10 as an operation display apparatus according to the embodiment. The information processing terminal 10 has the functions of inputting, generating, displaying and editing information, such as a document or image data, and the function of outputting the document and the image data to external devices. The information processing terminal 10 is a portable terminal having an approximately B5 size and formed in a flat tabular shape, and a display face S is provided on the whole area of the main body surface of the information processing terminal 10. A touch panel to detect the position on which the touch panel is touched by a finger or a pen, is provided across the whole area on the display face S. The input of handwritten characters, various operations and the like are received by the touch panel.

On the side faces of the information processing terminal 10, a large number of proximity sensors 18a to detect the close proximity to or the contact with another information processing terminal 10 or the like are disposed around the entire circumference of the information processing terminal 10. In an approximately center of the rear face (back face) of the information processing terminal 10, a load sensor 18b to detect whether the information processing terminal 10 is placed on a desk or is mounted on a predetermined dock, is provided.

Figure 2:
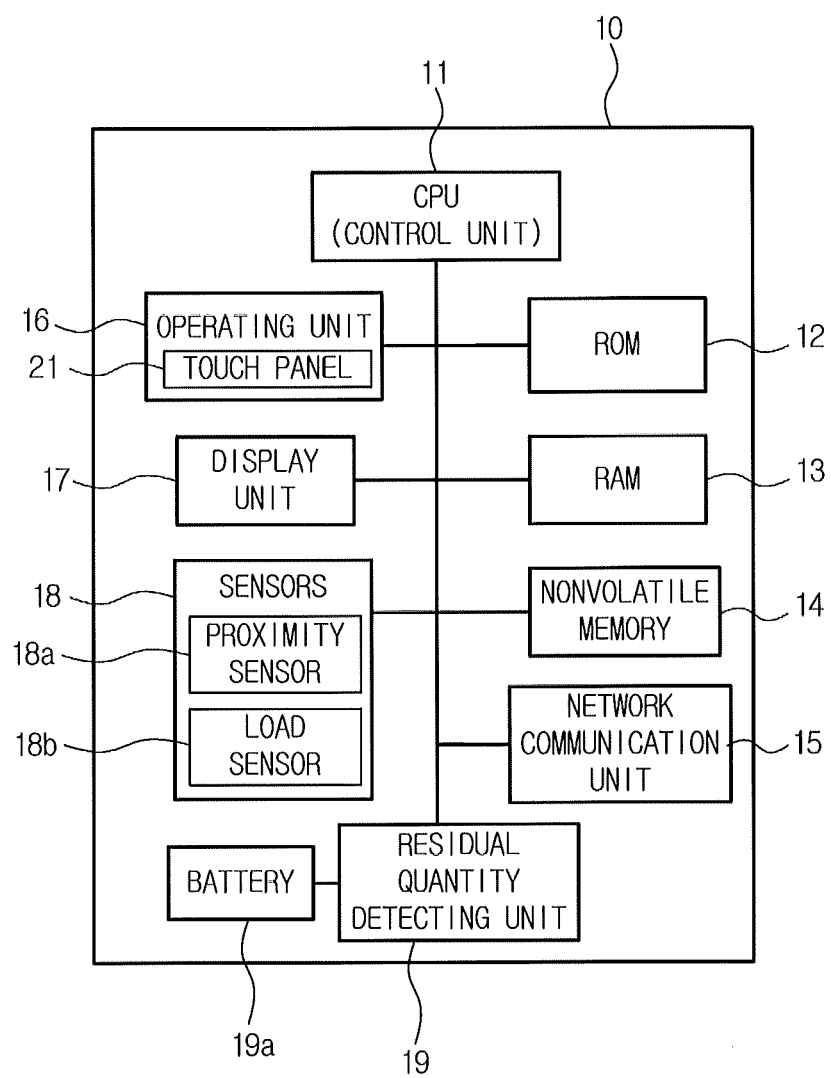
FIG. 2 is a block diagram showing the schematic configuration of the electrical system of the information processing terminal according to the embodiment.

FIG. 2 shows the schematic configuration of the electrical system of the information processing terminal 10. The information processing terminal 10 comprises a CPU 11 as a control unit to comprehensively control the operations of the information processing terminal 10. In the information processing terminal 10, the CPU 11 is connected with a ROM (Read Only Memory) 12, a RAM (Random Access Memory) 13, a nonvolatile memory 14, a network communication unit 15, an operating unit 16, a display unit 17, various sensors 18, and a residual quantity detecting unit 19 to detect the residual quantity of a battery, via a bus. Further, the information processing terminal 10 comprises a battery 19a to supply power to each unit of the information processing terminal 10. In particular, the CPU 11 controls the display contents of the display unit 17.

In the ROM 12, various programs and data are stored. By executing the processes by the CPU 11 in accordance with these programs, each function of the information processing terminal 10 is realized. The RAM 13 is used as a work memory to temporarily store various data when the CPU 11 executes the process in accordance with the programs, or a memory to temporarily store the display data.

The nonvolatile memory 14 is a memory in which the stored contents are retained even if the information processing terminal 10 is turned off. In the nonvolatile memory 14, various types of information, such as documents, image files, various setting contents, user information, terminal information (network address and the like) and the like are stored.

The network communication unit 15 has the function of connecting the network and communicating with various external devices via wireless communications. For example, the documents and image data to be displayed are inputted from the external devices via the network communication unit 15.

The display unit 17 is constructed by a liquid crystal display or the like. The display unit 17 displays the windows corresponding to the display data stored in a predetermined area of the RAM 13. The CPU 11 generates and processes the display data. The operating unit 16 is provided on the whole area of the display face S of the display unit 17 and is constructed by a touch panel 21 to detect the position on which the touch panel 21 is touched by a finger or a pen. It is noted that some operating switches may be provided in addition to the touch panel 21. The detecting methods performed by the touch panel 21 may be arbitrary. For example, electrostatic capacitance, analog/digital resistive films, infrared rays, ultrasonic waves, electromagnetic induction may be used.

The sensors 18 include the proximity sensors 18a and the load sensor 18b which are described above. For example, an infrared ray sensor is used as the proximity sensors 18a. Switches including an actuator or optical sensors can be applied for the load sensor 18b. Besides, a sensor that detects whether the information processing terminal 10 is held by a user's hand may be provided. Whether the information processing terminal 10 is mounted on the dock may be detected based on the presence or absence of the electrical connection between the dock and the information processing terminal 10.

The residual quantity detecting unit 19 detects the residual quantity of the battery 19a in accordance with the output voltage of the battery 19a.

The information processing terminal 10 includes the touch panel 21 on the whole area of the display face S of the display unit 17. The CPU 11 switches the state of a specific area between the state in which the display of the information and the detection of the touch action for the touch panel 21 are operated and the state in which the above display and the above detection are not operated. In this case, as shown in FIG. 3B, a portion which has the predetermined width (for example, 3 cm) from the end of the display face S toward the inner side of the display unit 17 and which is arranged along the circumferential edge of the display face S around the main body (four sides that surrounds the central portion of the display face S having a rectangular shape) is represented as a specific area 30. In FIG. 3B, the specific area 30 is shown as the gray portion. That is, in the portion in which the frame having not less than the predetermined width is not provided on the outer side of the end edge of the display face S of the display unit 17, the specific area 30 is provided along the end edge of the display face S.

Figure 3A:
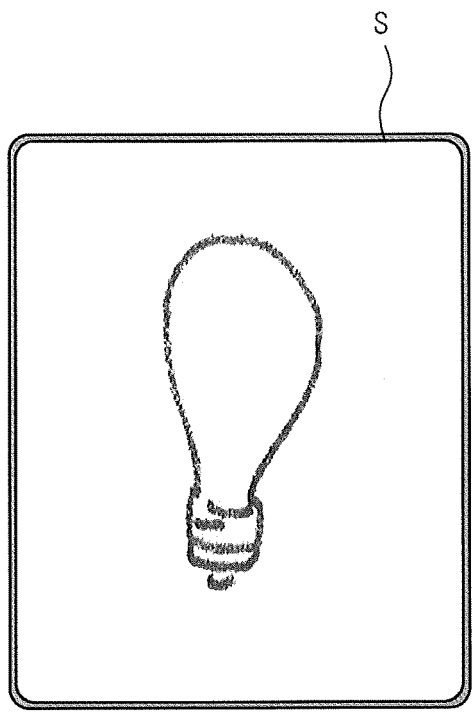
FIGS. 3A and 3B are views showing the comparison of a situation in which a specific area is set to an operable state and a situation in which a specific area is set to a non-operable state (frame area)
Figure 3B:
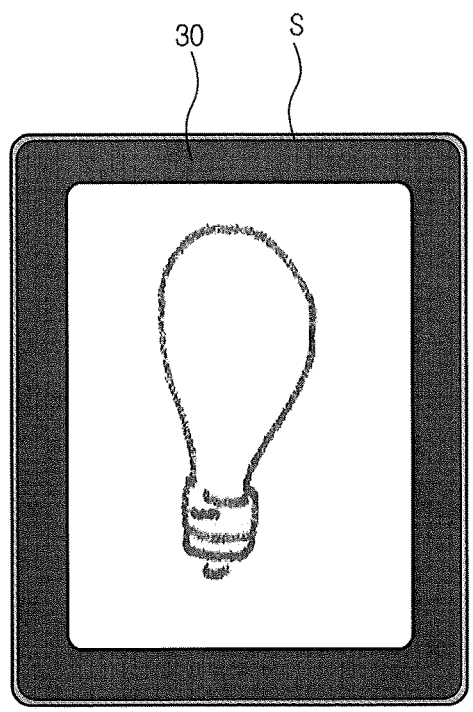

FIG. 3A shows the situation in which the specific area 30 is set to an operable state where the display of the information and the detection of the touch action are operated. FIG. 3B shows the situation in which the specific area 30 is set to a non-operable state where the above display and the detection of the touch action are not operated. In FIG. 3A, the whole area of the display face S is in the operable state. In FIG. 3B, the specific area 30 is in the non-operable state, and a portion on the inner side of the specific area 30 is in the operable state. It is noted that the portion which is set to the operable state on the display face S is also referred to as an operable area, regardless of whether the above portion is the specific area 30 or not. Further, a portion which is set to the non-operable state in the specific area 30 is also referred to as a frame area. In FIG. 3B, all of four sides forming the circumferential edge of the display face S are the frame area.

The frame area is represented in a visually recognizable form so as to be clearly distinguished from the operable area where the contents are displayed. For example, a patternless image drawn in a specific color (for example, black or gray) or woven patterns (for example, lattice patterns or mosaic patterns) are displayed. When the black is applied to the frame area, the backlights disposed in the frame area may be simultaneously turned off. Further, in case that the specific area and the other display area are constituted by separate display devices, when the specific area is set to the frame area, the display performed by the display device for the specific area or the power supply of the display device for the specific area may be turned off.

Figure 4:
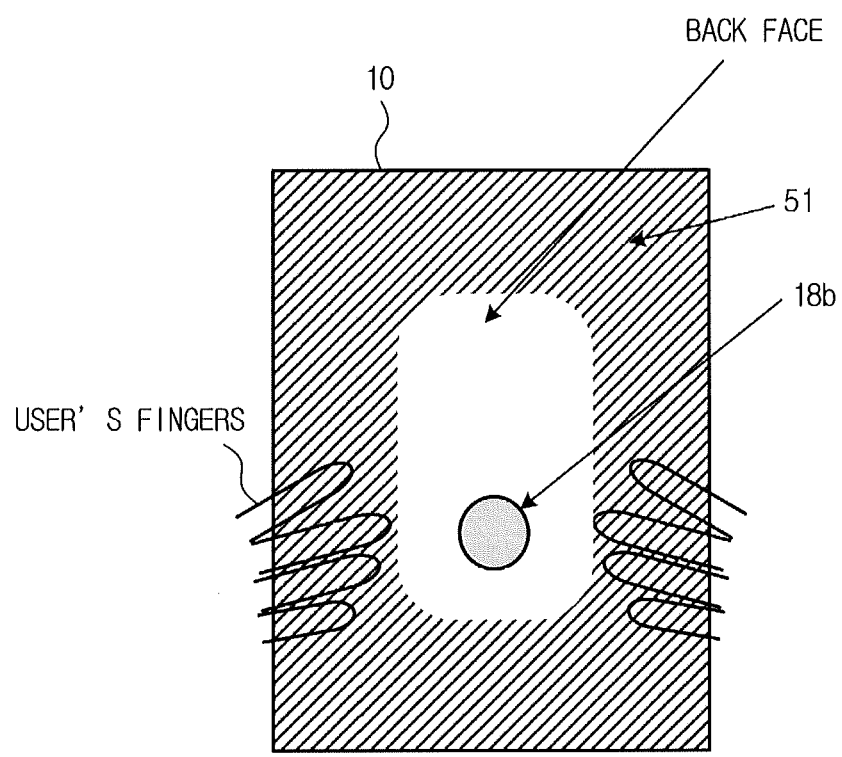
FIG. 4 is an explanatory view showing an area which user's fingers can reach in case that the user holds the information processing terminal by the user's hands in a normal usage situation.
Figure 5:
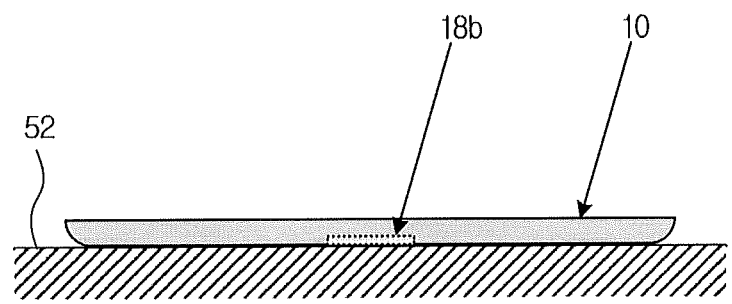
FIG. 5 is a view showing a state where the information processing terminal is placed on a desk.

As shown in FIG. 4, the load sensor 18b is disposed so as to keep away from the area 51 which the user's fingers reach (portion marked in oblique lines in the drawing) in case that the user holds the information processing terminal 10 by the user's hands in a normal usage situation. When the information processing terminal 10 is held by the user's hands, the load sensor 18b is turned off. When the information processing terminal 10 is placed on a desk 52 so as to contact the back face of the information processing terminal 10 with the desk 52, as shown in FIG. 5, the load sensor 18b detects that the information processing terminal 10 is placed on the desk 52, and is turned on. That is, the load sensor 18b has the function of the holding hand detecting unit to detect whether the information processing terminal 10 is held by the user's hand.

When the load sensor 18b is turned on, as shown in FIG. 3A, the information processing terminal 10 sets the specific area 30 to the operable state. Thereby, the whole area of the display face S is set to the operable area where the display and the detection of the touch action are operated. Thus, the display face S can be extensively utilized.

On the other hand, when the load sensor 18b is turned off, as shown in FIG. 3B, the information processing terminal 10 sets the specific area 30 to the frame area by controlling the specific area 30 so as to become the non-operable area. Accordingly, the user can recognize that the portion of the specific area 30 becomes the frame area (non-operable state) where the detection of the touch action is not operated, at a glance. Thereby, it is possible to securely hold the above portion by the user's hands. Further, because the detection of the touch action is not operated in the frame area, the touch action performed with the fingers of the user who holds the information processing terminal 10 is not erroneously detected as any operation.

Figure 6:
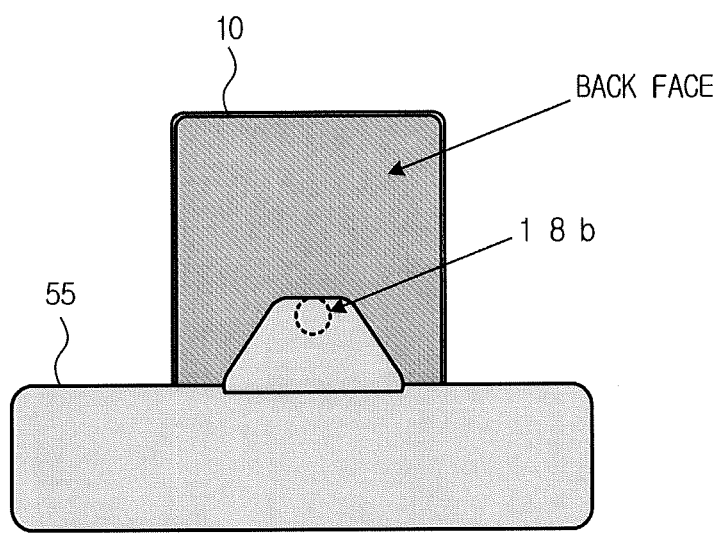
FIG. 6 is a view showing a state where the information processing terminal is mounted on a dock.

FIG. 6 shows a state where the information processing terminal 10 is mounted on a dock 55. When the information processing terminal 10 is mounted on the dock 55, the load sensor 18b provided on the back face of the information processing terminal 10 detects the contact with a mounting face of the dock 55, and the load sensor 18b is turned on.

Accordingly, as shown in FIG. 3A, the specific area 30 is controlled so as to become the operable state, and the whole area of the display face S is set to the operable area. The mounting of the information processing terminal 10 on the dock 55 may be detected in accordance with the electrical connection with the dock 55.

When a plurality of information processing terminals 10 are used by disposing them side by side in cooperation with each other, the CPU 11 controls the specific area 30 so as to set the part of the specific area 30, which is arranged in the boundary with another information processing terminal 10 disposed with the information processing terminal 10 side by side, to the operable state, and so as to set the other part of the specific area 30 to the non-operable state (frame area). Another information processing terminals 10 disposed side by side is detected by the load sensor 18b.

Figure 7A:
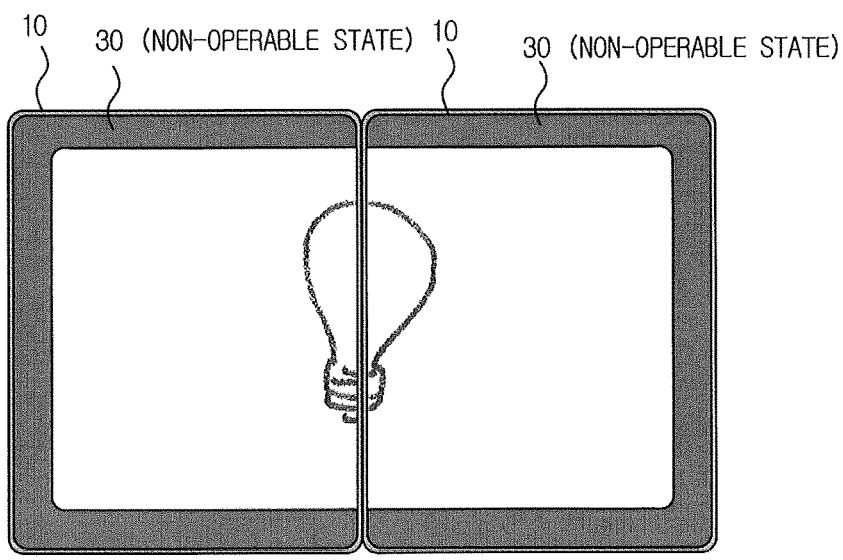
FIGS. 7A and 7B are views showing a state where two information processing terminals are used by disposing them side by side.
Figure 7B:
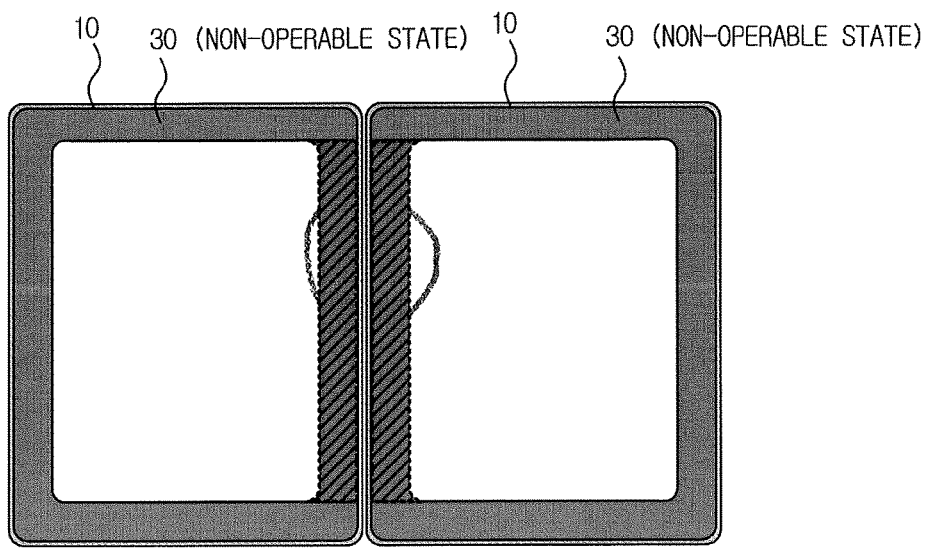

FIGS. 7A and 7B show a state where two information processing terminals 10 are horizontally disposed side by side. FIG. 7A shows the situation in which the CPU 11 controls the specific area 30 so as to set the part (referred to as the boundary part) of the specific area 30, which is arranged in the boundary between the two information processing terminals 10, to the operable state, and so as to set the other parts of the specific area 30 (part drawn in gray in the drawing) to the non-operable state (frame area). In contrast with FIG. 7A, FIG. 7B shows the situation in which the entire specific area 30 is set to the non-operable state (frame area). In FIG. 7B, a part corresponding to the boundary part of the specific area 30, which is set to the operable state in FIG. 7A is shown by the oblique lines.

Figure 8A:
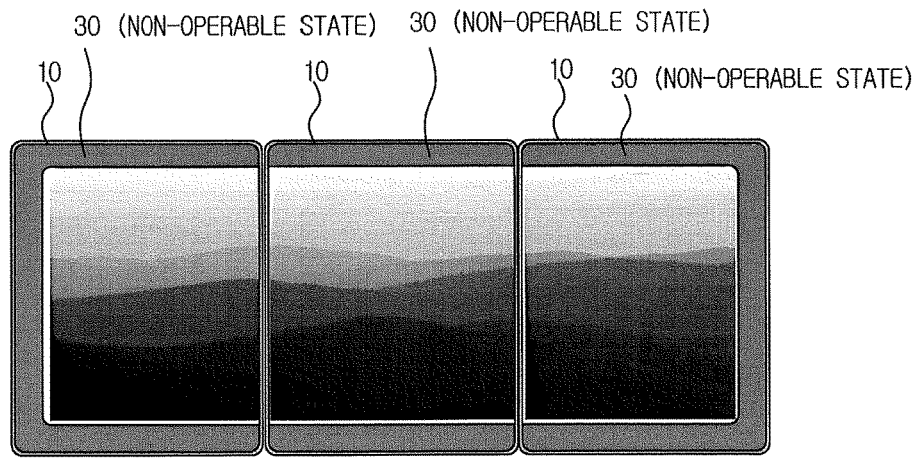
FIGS. 8A and 8B are view showing a state where three information processing terminals are used by disposing them side by side.
Figure 8B:
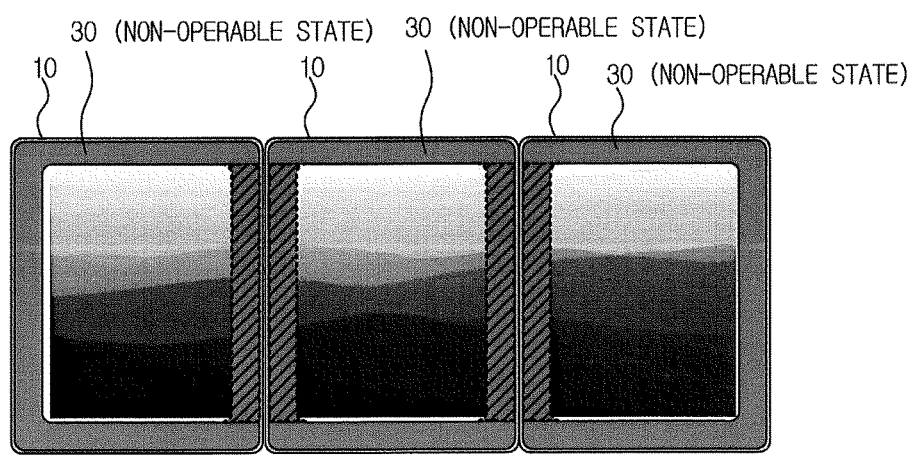

FIGS. 8A and 8B show a state where three information processing terminals 10 are horizontally disposed side by side. FIG. 8A shows the situation in which the CPU 11 controls the specific area 30 so as to set the boundary parts of the specific area 30, which are arranged in the boundaries between the adjacent information processing terminals 10, to the operable state, and so as to set the other parts of the specific area 30 (parts drawn in gray in the drawing) to the non-operable state (frame area). In contrast with FIG. 8A, FIG. 8B shows the situation in which the entire specific area 30 is set to the non-operable state (frame area). In FIG. 8B, the parts corresponding to the boundary parts of the specific area 30, which are set to the operable state in FIG. 8A are shown by the oblique lines.

Figure 9A:
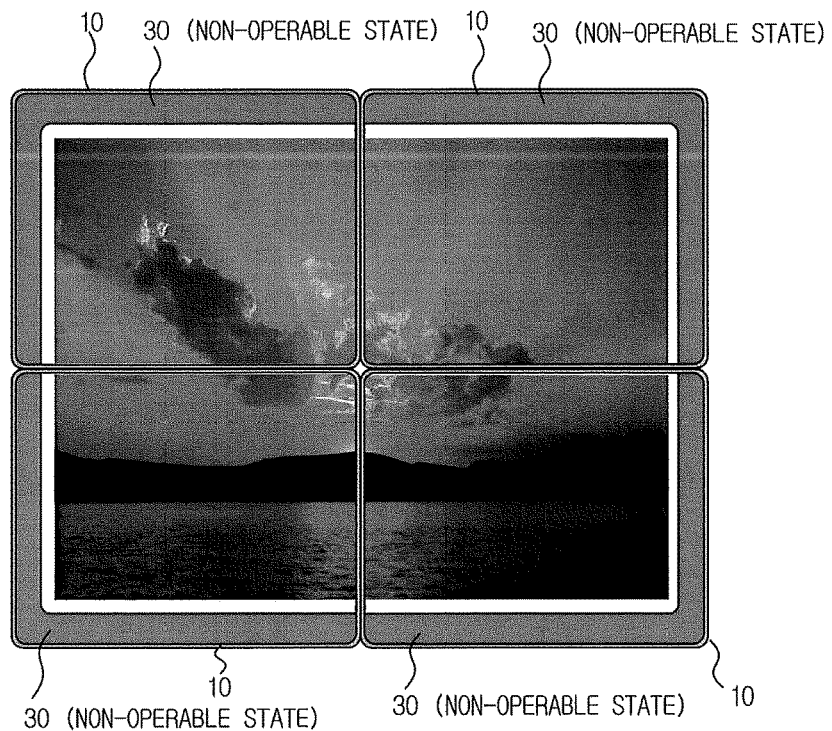
FIGS. 9A and 9B are view showing a state where four information processing terminals are used by disposing them side by side in the form of two-by-two matrix.
Figure 9B:
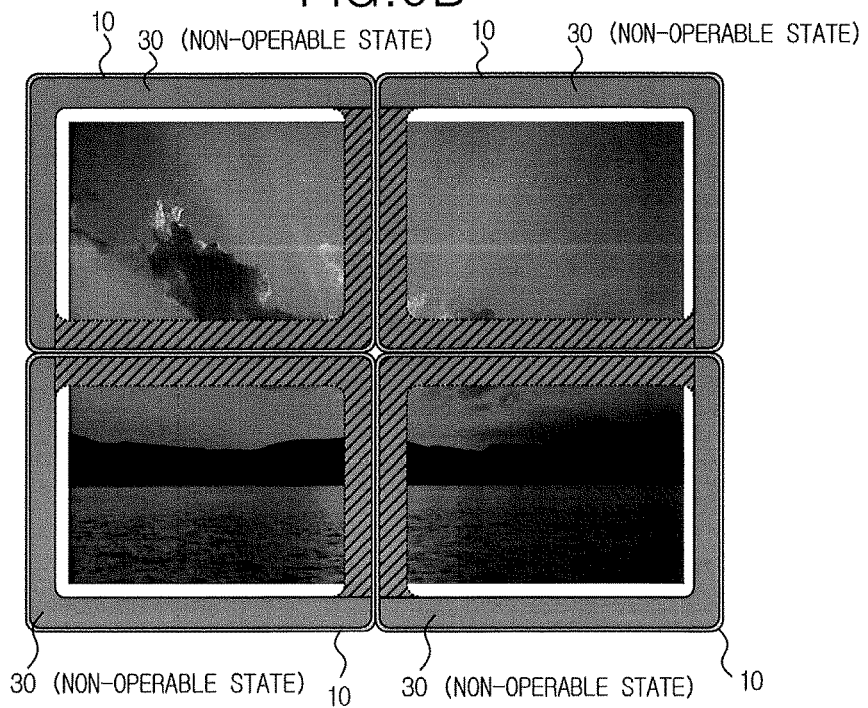

FIGS. 9A and 9B show a state where four information processing terminals 10 are disposed side by side in the form of two-by-two matrix. FIG. 9A shows the situation in which the CPU 11 controls the specific area 30 so as to set the boundary parts of the specific area 30, which are arranged in the boundaries between the adjacent information processing terminals 10, to the operable state, and so as to set the other parts of the specific area 30 (parts drawn in gray in the drawing) to the non-operable state (frame area). In contrast with FIG. 9A, FIG. 9B shows the situation in which the entire specific area 30 is set to the non-operable state (frame area). In FIG. 9B, the parts corresponding to the boundary parts of the specific area 30, which are set to the operable state in FIG. 9A are shown by the oblique lines.

The proximity sensors 18a includes a large number of sensors and finely detects the length or the position of a part which is in contact with (or in close proximity to) another apparatus. Accordingly, the CPU 11 can control the specific area 30 so as to set only a part corresponding to the range in which the information processing terminal 10 is actually in contact with or in close proximity to another apparatus, to the operable state.

Figure 10A:
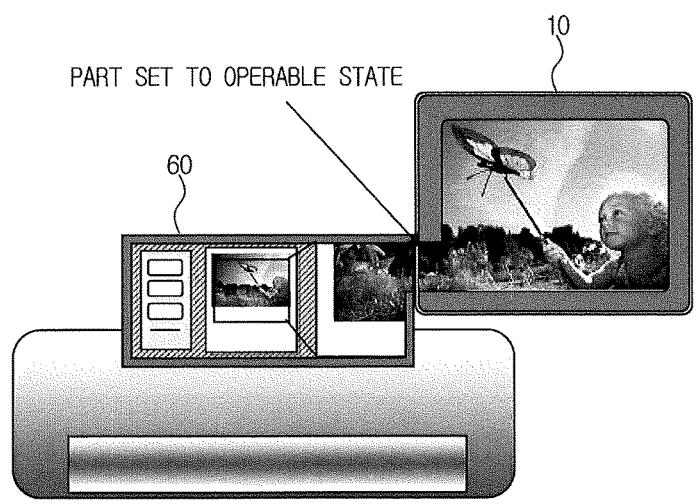
FIGS. 10A and 10B are views showing a state where the information processing terminal is used in cooperation with the operation display panel of another apparatus.
Figure 10B:
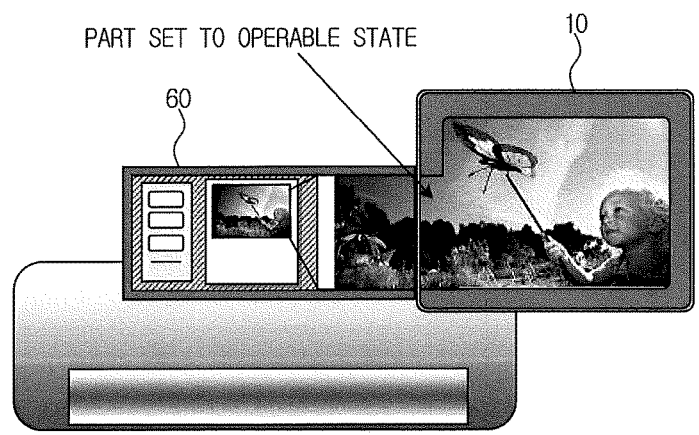

FIGS. 10A and 10B show the case in which the information processing terminal 10 is used in cooperation with the operation display panel 60 of another apparatus, and in which the CPU 11 controls the specific area 30 so as to set only a part corresponding to the range where the information processing terminal 10 is actually in contact with the operation display panel 60 to the operable state. FIG. 10A shows the case in which the range where the information processing terminal 10 is in contact with the operation display panel 60, is short, and FIG. 10B shows the case in which the above range is long.

Thus, by the above control, when the information processing terminal 10 cooperates with the operation display panel 60 of another apparatus, the continuity of the display contents is improved. Further, because a part of the specific area 30, in which the information processing terminal 10 is not in contact with the operation display panel 60 is set to the non-operable state (frame area), even if the user holds the above part by the user's hand, it is possible to prevent the erroneous detection in which the touch action performed with the fingers of the user is recognized as any operation. Therefore, the information processing terminal 10 can cooperate with the operation display panel 60 by holding the information processing terminal 10 by the user's hand to arrange it adjacent to the operation display panel 60.

Next, a case in which the CPU 11 switches the state of the specific area 30 between the operable state and the non-operable state (frame area) in accordance with the user's instruction, will be explained.

Figure 11A:
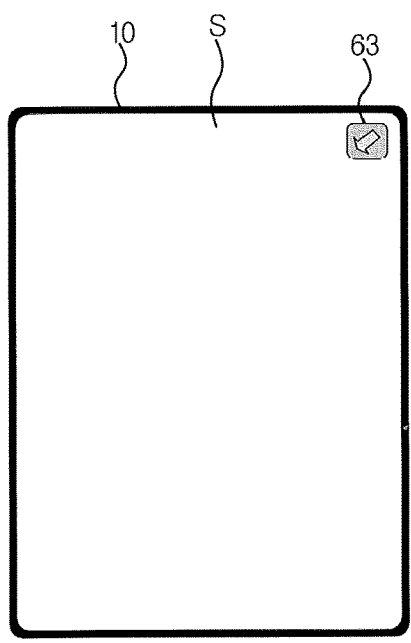
FIGS. 11A and 11B are views showing a state where the specific area is switched between the operable state and the non-operable state (frame area) by using a switching button.
Figure 11B:
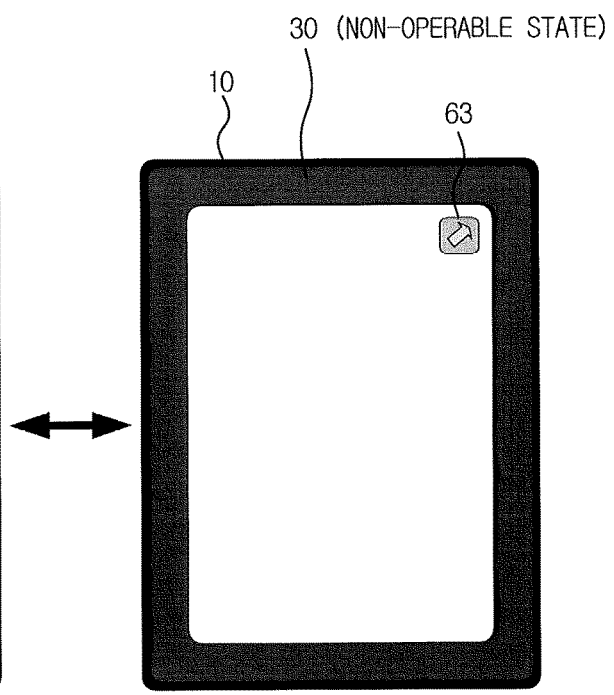

For example, as shown in FIGS. 11A and 11B, a switching button 63 to switch the state of the specific area 30 between the operable state are the non-operable state (frame area) is displayed on any of the operable area (in this example, a corner of the operable area). When the switching button 63 is operated in the state where the whole area of the display face S becomes the operable area (FIG. 11A), the specific area 30 is changed to the non-operable state (frame area) (FIG. 11B).

In contrast, when the switching button 63 is operated in the state where the specific area 30 is set to the non-operable state (frame area) (FIG. 11B), the specific area 30 is changed to the operable state, and the whole area of the display face S becomes the operable area (FIG. 11A).

The state of the specific area 30 may be switched between the operable state and the non-operable state (frame area) by the method of dragging or flicking the switching button 63 to the inner side or the outer side, the method of invoking a menu by the touching operation to select the switching button 63, and the method of drawing a gesture with a finger, or the like, in addition to the push of the switching button 63.

Next, the on/off control of the backlights of the display unit 17 will be explained.

Figure 12:
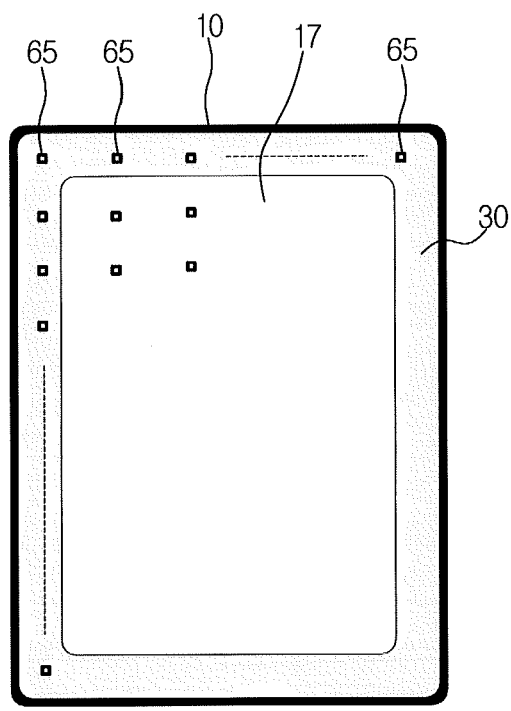
FIG. 12 is a view schematically showing the structure of a liquid crystal display having a large number of small-size backlights, which are dispersedly disposed in the form of matrix in plain.

FIG. 12 schematically shows the structure of the liquid crystal display having a large number of small-size backlights 65, which are dispersedly disposed in the form of matrix in plain. In this embodiment, the backlights 65 are LEDs (Light Emitting Diode). The arrangement of the backlights 65 is not limited to the form of the matrix in plain.

The on/off control can be carried out for each backlight 65. When the CPU 11 switches the whole or a part of the specific area 30 from the operable state to the non-operable state (frame area), the CPU 11 controls the backlights 65 corresponding to the part to be set to the non-operable state, so as to be turned off. Accordingly, the power consumption can be reduced. At least, the on/off control may be carried out for the backlights 65 in units of area where the switching is carried out between the operable state and the non-operable state.

In the configuration in which the backlights 65 arranged in the portion corresponding to the frame area in the non-operable state are controlled so as to be turned off, when the power mode of the information processing terminal 10 is set to a power saving mode at which the information processing terminal 10 is operated by lower consumption power than the usual, the CPU 11 sets the specific area 30 to the non-operable state by changing the specific area 30 to the frame area. Therefore, the power consumption can be suppressed by the amount of electric energy consumed by the backlights 65 to be turned off.

In the power saving mode, the specific area 30 is automatically controlled so as to be set to the frame area in the non-operable state. Thereby, the power consumption is suppressed. In contrast, in the normal power mode, the specific area 30 can be set to the operable area. In the normal power mode, the whole area of the display face S is controlled so as to be set to the operable area. Thereby, it is possible to display much information and receive the operations from the user.

When the residual quantity of the battery 19a of the information processing terminal 10 is reduced lower than a predetermined value, the CPU 11 may set the specific area 30 to the non-operable state (frame area), or set the whole area of the display face S to the non-operable state, and may turn off the backlights 65 corresponding to the part to be set to the non-operable state. When the whole area of the display face S is set to the non-operable state, the CPU 11 may control the power supply to the display unit 17 so to be completely turned off.

Figure 13A:
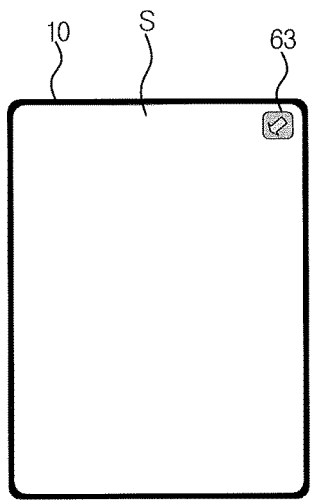
FIGS. 13A to 13C are views showing a state where the whole area is switched to the non-operable state by the user's operation.
Figure 13B:
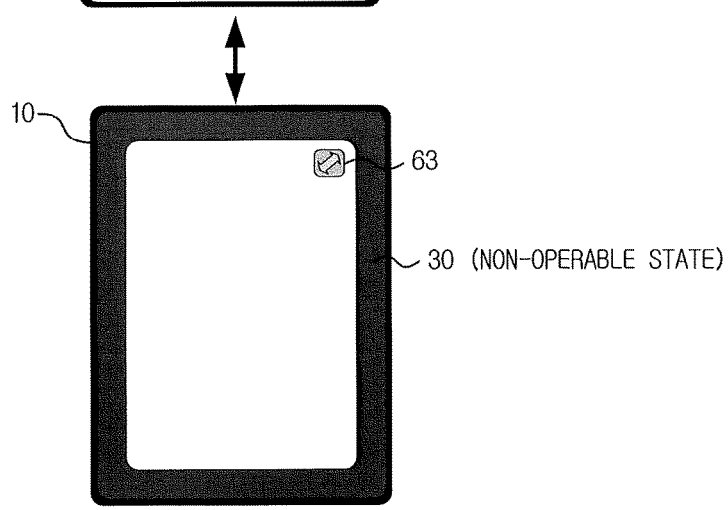
Figure 13C:
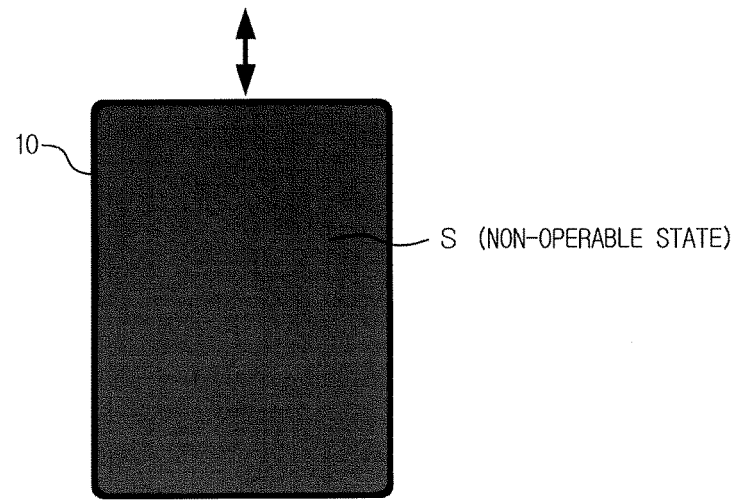

As shown in FIGS. 13A to 13C, the CPU 11 can switch the whole area of the display face S to the non-operable state in accordance with the user's operation. FIG. 13A shows the state which is similar to that of FIG. 11A. In the state, the whole area of the display face S is set to the operable area, and the switching button 63 is displayed in the corner of the operable area. An arrow is shown in the switching button 63, and the drag operation or the flick operation can be performed for the switching button 63 in the direction indicated by the arrow. In FIG. 13A, an arrow indicating an inner direction is shown in the switching button 63.

FIG. 13B shows the state where the specific area 30 is changed to the non-operable state (frame area) by receiving the drag operation or the flick operation for the switching button 63 to the inner side in the state shown in FIG. 13A. In this state, a two-headed arrow indicating the inner direction and the outer direction is displayed in the switching button 63. When the drag operation or the flick operation is received for the switching button 63 to the outer side, the display face S returns to the state shown in FIG. 13A.

When the drag operation or the flick operation is received for the switching button 63 to the inner side in the state shown in FIG. 13B, as shown in FIG. 13C, the whole area of the display face S is changed to the non-operable area. The drag operation or the flick operation to be performed for the switching button 63 to the inner side is considered as user's request for turning off the information processing terminal 10 or transferring the current state of the information processing terminal 10 to a standby state where the display face S is turned off. Accordingly, when the drag operation or the flick operation is received for the switching button 63 to the inner side in the state shown in FIG. 13B, the CPU 11 turns off the power supply of the information processing terminal 10 or transfers to the standby mode. In the power-off state or the standby mode state, the backlights 65 are turned off, and the display face S spontaneously becomes the display state which is similar to the non-operable state.

The standby mode state is a state where each function of the information processing terminal 10 is not operated, and is approximately equal to the state where the power supply is off. However, in the standby mode state, when any activation trigger (specific switch operation or the like) occurs, the standby mode state returns to the normal state (state in which each function is operable) sooner than the case in which the power-off state returns to the normal state.

Next, the process of the display switching control carried out by the CPU 11 of the information processing terminal 10 will be explained.

Figure 14:
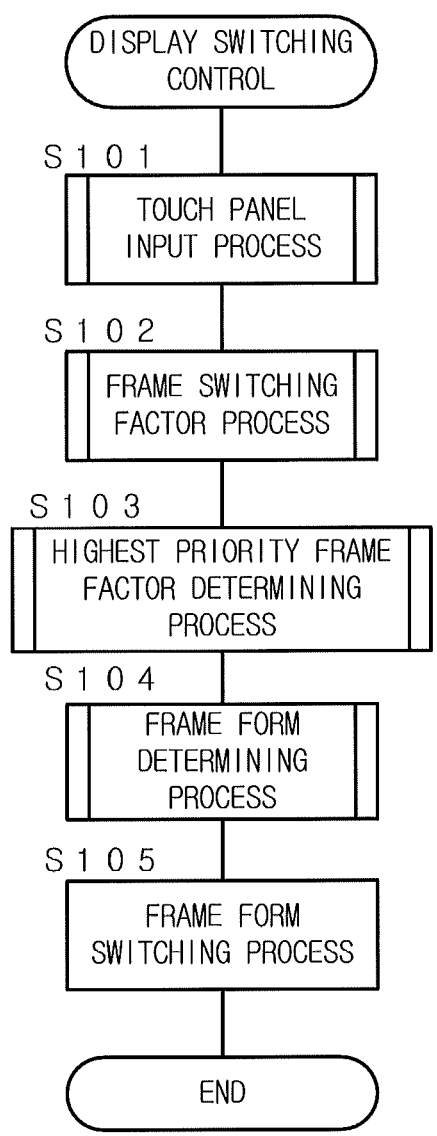
FIG. 14 is a flowchart showing the outline of the display switching control.

FIG. 14 shows the outline of the display switching control. This process is repeatedly executed. First, the touch panel input process is carried out (Step S101). This process is executed only when any touch action is received by the touch panel 21.

Figure 15:
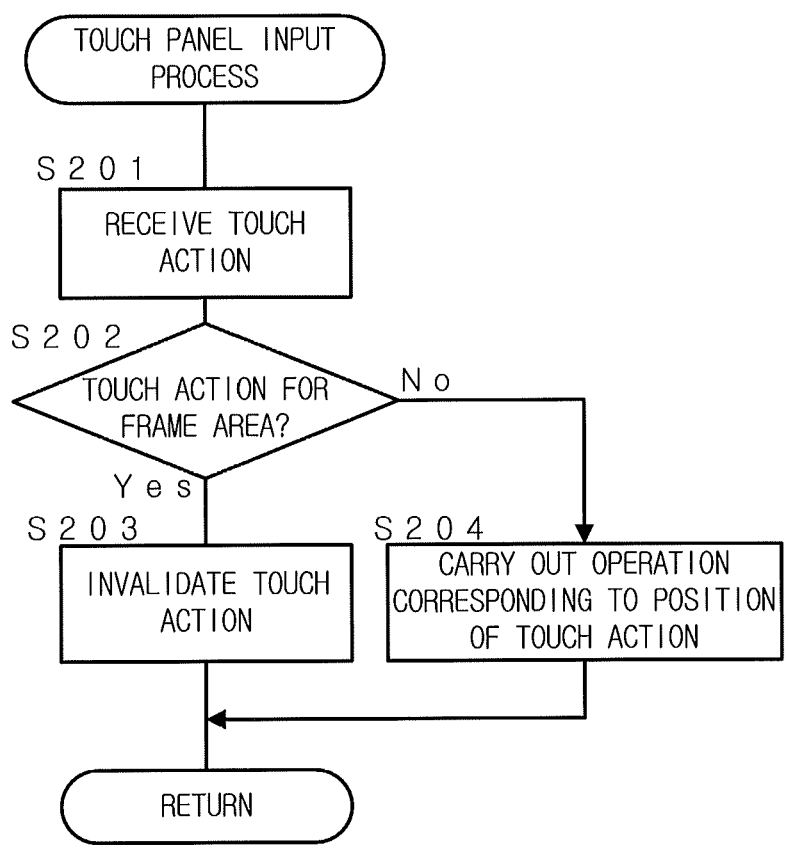
FIG. 15 is a flowchart showing the detail of the touch panel input process (Step S101 in FIG. 14)

FIG. 15 shows the detail of the touch panel input process shown in Step S101. When the touch panel receives any touch action (Step S201), it is determined whether the touch action is performed for the frame area (specific area 30 in the non-operable state) (Step S202). When the touch action is performed for the frame area (Step S202; YES), the touch action is invalidated (Step S203), and the process is ended (Return). When the touch action is performed for the area other than the frame area (Step S202; NO), the touch action is validated. Further, the operation corresponding to the position of the touch action is carried out (Step S204), and the process is ended (Return).

Next, the frame switching factor process is carried out (Step S102 in FIG. 14). According to this process, the state of each switching factor which is the determination criteria for determining whether the specific area 30 is set to the non-operable state (frame area) or to the operable state in accordance with each type of sensor, the user's operation, the change in the state of the information processing terminal 10 and the like, is detected.

FIG. 16 shows a frame switching factor table 70 in which the detection results of the states of each switching factor are registered. In the frame switching factor table 70, a plurality of switching factors, values indicating whether each switching factor meets a factor (ON factor) for setting the specific area 30 to the non-operable state (frame area), values indicating whether each switching factor meets a factor (OFF factor) for setting the specific area 30 to the operable state, and the priority order of each switching factor, are registered.

The value of the ON factor and the value of the OFF factor are sequentially rewritten according to the frame switching factor process (Step S102 in FIG. 14). With respect to the value of the ON factor and the value of the OFF factor, the value "1" represents "meeting the ON/OFF factor", and the value "0" represents "not meeting the ON/OFF factor".

In the embodiment, the determination results of the ON factor and the OFF factor are registered for the detection value of the proximity sensors 18a, the detection value of the load sensor 18b, the switching operation performed by the user via the switching button 63, the residual quantity of the battery 19a, and the power saving mode, respectively. In the priority order, the value "1" is the lowest. As the value becomes large, the priority order becomes high.

Figure 17:
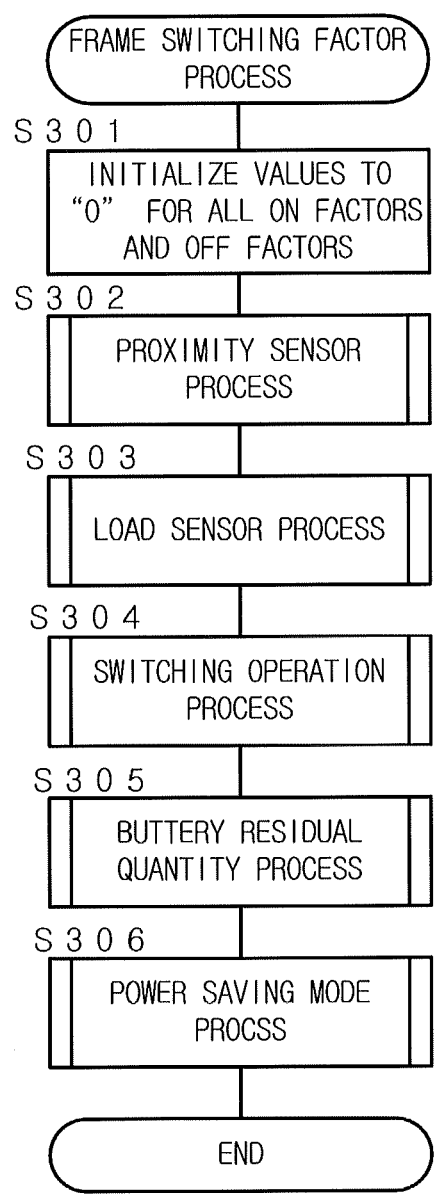
FIG. 17 is a flowchart showing the outline of the frame switching factor process (Step S102 in FIG. 14)

FIG. 17 shows the outline of the frame switching factor process (Step S102 in FIG. 14). First, in the frame switching factor table 70, all of the values are initialized to "0" for the ON factors and the OFF factors (Step S301). Subsequently, the CPU 11 carries out the proximity sensor process (Step S302). In the proximity sensor process, the CPU 11 determines whether the ON factor for setting the specific area 30 to the non-operable state or the OFF factor for setting the specific area 30 to the operable state, is met in accordance with the detection value of the proximity sensor 18a. Then, the value of the ON factor and the value of the OFF factor are registered in the frame switching factor table 70.

Subsequently, the CPU 11 carries out the load sensor process (Step S303). In the load sensor process, the CPU 11 determines whether the ON factor or the OFF factor is met in accordance with the detection value of the load sensor 18b. Then, the value of the ON factor and the value of the OFF factor are registered in the frame switching factor table 70 (Step S303).

Subsequently, the CPU 11 carries out the switching operation process (Step S304). In the switching operation process, the CPU 11 determines whether the switching instruction is received from the user. When the instruction is received from the user, the frame switching factor table 70 is updated so as to set the ON factor or the OFF factor to "1" in accordance with the instruction.

Subsequently, the CPU 11 carries out the battery residual quantity process (Step S305). In this process, the CPU 11 checks the residual quantity of the battery 19a, and determines whether the ON factor for setting the specific area 30 to the non-operable state or the OFF factor for setting the specific area 30 to the operable state, is met in accordance with the residual quantity. Then, the frame switching factor table 70 is updated in accordance with the value of the ON factor and the value of the OFF factor.

Subsequently, the CPU 11 carries out the power saving mode process (Step S306). In this process, the CPU 11 determines whether the power mode is the power saving mode. In accordance with the results, the value of the ON factor or the value of the OFF factor relating to the power saving mode is changed to "1". Then, the frame switching factor table 70 is updated in accordance with the value of the ON factor and the value of the OFF factor.

Figure 18:
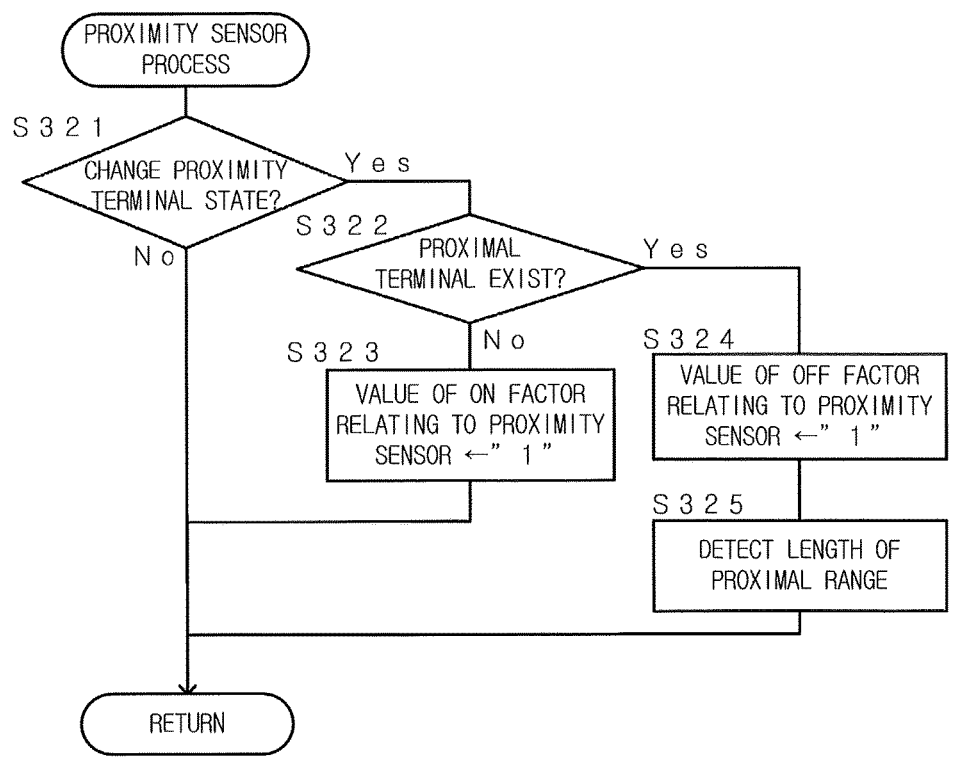
FIG. 18 is a flowchart showing the detail of the proximity sensor process (Step S302 in FIG. 17)

FIG. 18 shows the detail of the proximity sensor process (Step S302 in FIG. 17). The CPU 11 determines whether the change in the state where the information processing terminal 10 is in contact with or in close proximity to another apparatus is caused, in accordance with the detection value of the proximity sensors 18a (Step S321). In case that the above change is not caused (Step S321; NO), the process is ended (Return). In case that the above change is caused (Step S321; YES), the CPU 11 determines whether another information processing terminal 10 or another apparatus disposed adjacent to the information processing terminal 10 exists, in accordance with the changed state (Step S322). In case that another information processing terminal 10 or the like does not exist (Step S322; NO), the value of the ON factor relating to the proximity sensors 18a is set to "1" in the frame switching factor table 70 (Step S323). Then, the process is ended (Return).

In case that another apparatus or the like disposed in contact with or in close proximity to the information processing terminal 10 side by side exists (Step S322; YES), the value of the OFF factor relating to the proximity sensors 18a is set to "1" (Step S324). Further, the length and the position of the range in which another apparatus is in contact with or in close proximity to the information processing terminal 10 are specified and stored (Step S325). Then, the process is ended (Return).

Figure 19:
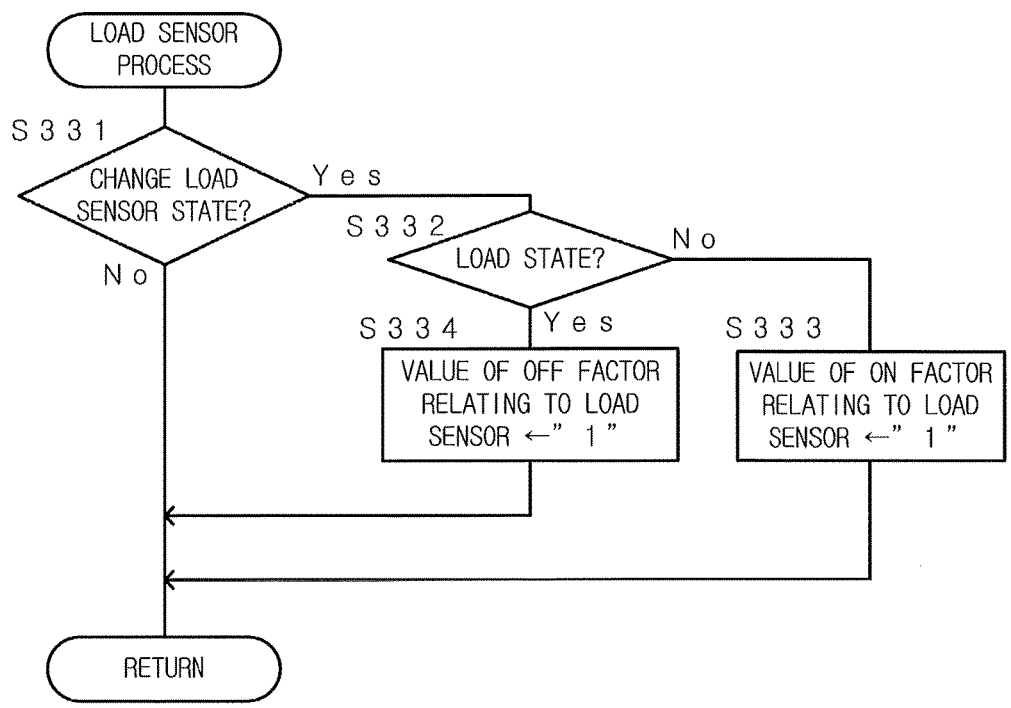
FIG. 19 is a flowchart showing the detail of the load sensor process (Step S303 in FIG. 17)

FIG. 19 shows the detail of the load sensor process (Step S303 in FIG. 17). The CPU 11 determines whether the change in the state where the information processing terminal 10 is placed on the desk 52 or is mounted on the dock 55 is caused, in accordance with the detection value of the load sensor 18b (Step S331). In case that the above change is not caused (Step S331; NO), the process is ended (Return). In case that the above change is caused (Step S331; YES), the CPU 11 determines whether the changed state is the state where the information processing terminal 10 is placed on the desk 52 or is mounted on the dock 55 (Step S332). In case that the changed state is not the state where the information processing terminal 10 is placed on the desk 52 or is mounted on the dock 55 (Step S332; NO), the value of the ON factor relating to the load sensor 18b is set to "1" in the frame switching factor table 70 (Step S333). Then, the process is ended (Return).

In case that the changed state is the state where the information processing terminal 10 is placed on the desk 52 or is mounted on the dock 55 (Step S332; YES), the value of the OFF factor relating to the load sensor 18b is set to "1" (Step S334). Then, the process is ended (Return).

Figure 20:
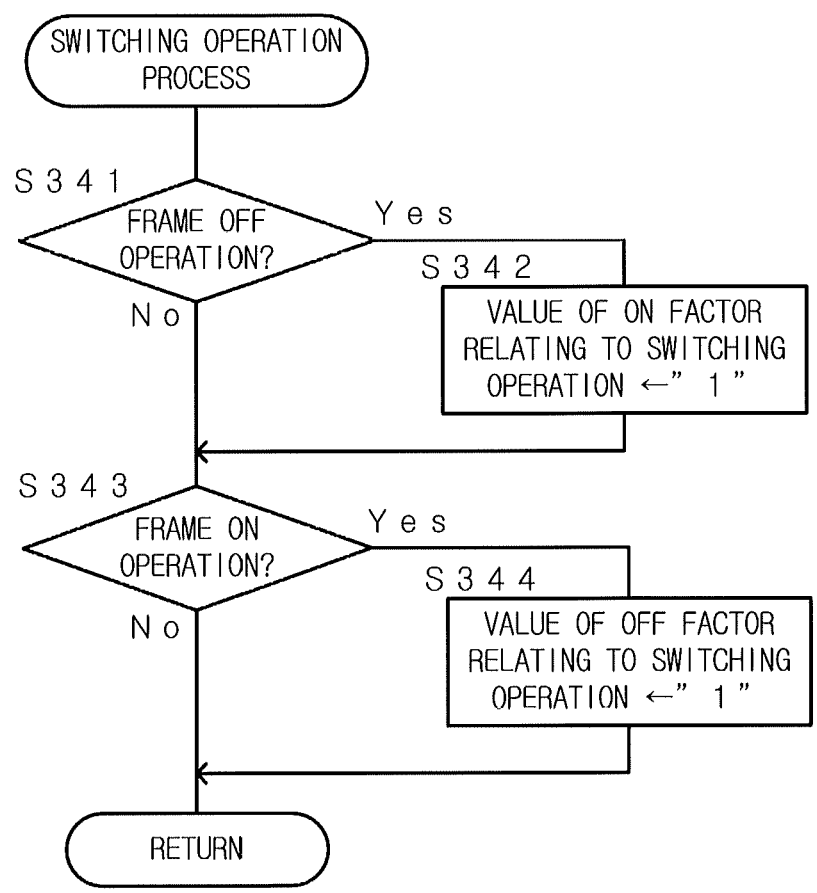
FIG. 20 is a flowchart showing the detail of the switching operation process (Step S304 in FIG. 17)

FIG. 20 shows the detail of the switching operation process (Step S304 in FIG. 17). When the information processing terminal 10 receives the operation for the switching button 63, which is manually performed by the user so as to set the specific area 30 to the non-operable state (frame area) (Step S341; YES), the value of the ON factor relating to the switching operation is set to "1" (Step S342). Then, the process proceeds to Step S343. In case that the above operation is not received (Step S341; NO), the process proceeds to Step S343. In Step S343, the CPU 11 determines whether the information processing terminal 10 receives the operation for the switching button 63, which is manually performed by the user so as to set the specific area 30 to the operable state. In case that the information processing terminal 10 receives the above operation (Step S343; YES), the value of the OFF factor relating to the switching operation is set to "1" (Step S344). Then, the process is ended (Return). In case that the information processing terminal 10 does not receive the above operation (Step S343; NO), the process is ended (Return).

Figure 21:
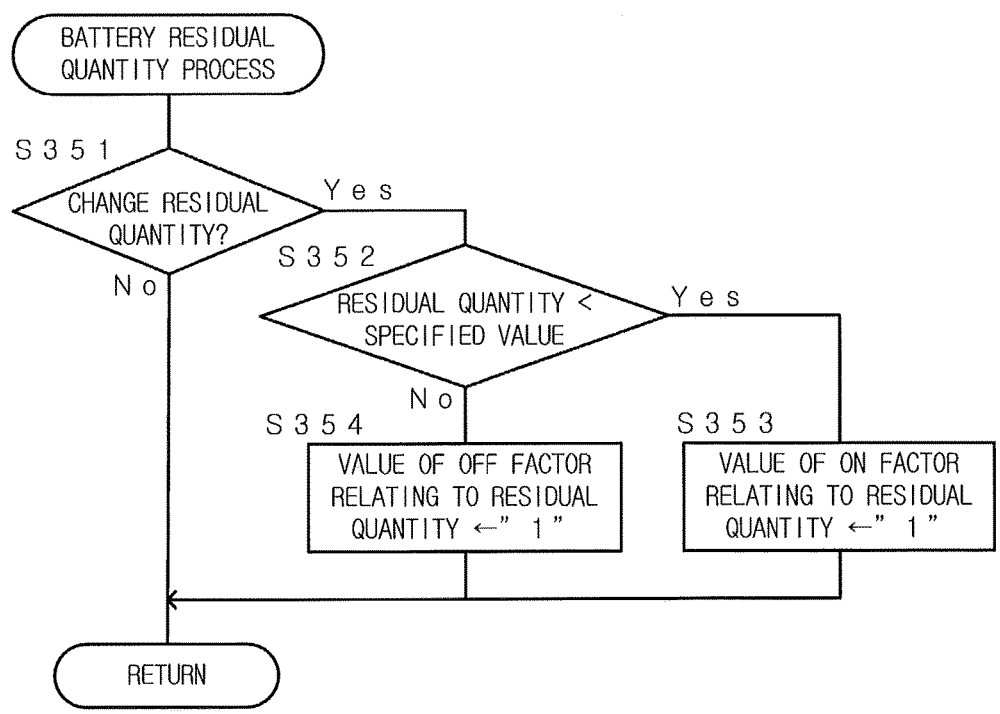
FIG. 21 is a flowchart showing the detail of the battery residual quantity process (Step S305 in FIG. 17)

FIG. 21 shows the detail of the battery residual quantity process (Step S305 in FIG. 17). The CPU 11 determines whether the change in which the residual quantity of the battery 19a exceeds a specified value or is lower than the specified value is caused, in accordance with the detection value of the residual quantity detecting unit 19 (Step S351). In case that the above change is not caused (Step S351; NO), the process is ended (Return). In case that the above change is caused (Step S351; YES), the CPU 11 determines whether the residual quantity of the battery 19a is lower than the specified value (Step S352). In case that the residual quantity of the battery 19a is lower than the specified value (Step S352; YES), the value of the ON factor relating to the residual quantity of the battery is set to "1" in the frame switching factor table 70 (Step S353). Then, the process is ended (Return).

In case that the residual quantity of the battery 19a is not lower than the specified value (Step S352; NO), the value of the OFF factor relating to the residual quantity of the battery is set to "1" (Step S354). Then, the process is ended (Return)

Figure 22:
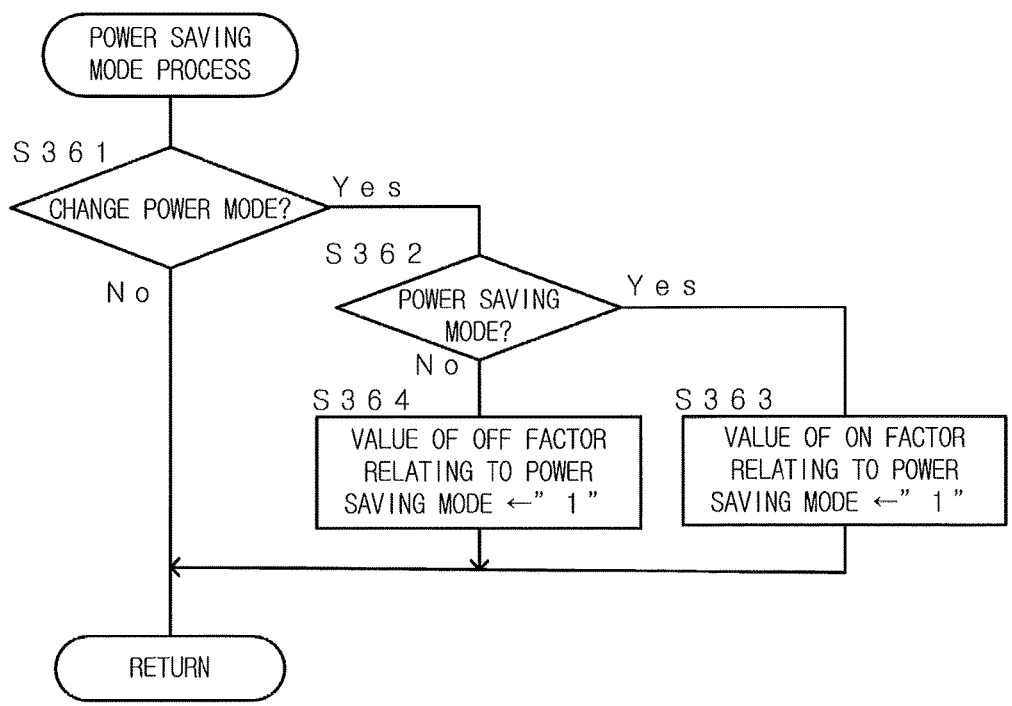
FIG. 22 is a flowchart showing the detail of the power saving mode process (Step S306 in FIG. 17)

FIG. 22 shows the detail of the power saving mode process (Step S306 in FIG. 17). The CPU 11 determines whether the change in the power mode is caused (Step S361). In case that the above change is not caused (Step S361; NO), the process is ended (Return). In case that the above change is caused (Step S361; YES), the CPU 11 determines whether the changed power mode is the power saving mode (Step S362). In case that the changed power mode is the power saving mode (Step S362; YES), the value of the ON factor relating to the power saving mode is set to "1" in the frame switching factor table 70 (Step S363). Then, the process is ended (Return).

In case that the changed power mode is not the power saving mode (Step S362; NO), the value of the OFF factor relating to the power saving mode is set to "1" (Step S364). Then, the process is ended (Return).

In FIG. 14, after the frame switching factor process is carried out as described above, the highest priority frame factor determining process is carried out (Step S103). In this process, among the ON factors or the OFF factors having the value of "1" in the frame switching factor table 70, the ON factor or OFF factor having the highest priority order is selected as the highest priority frame factor.

Figure 23:
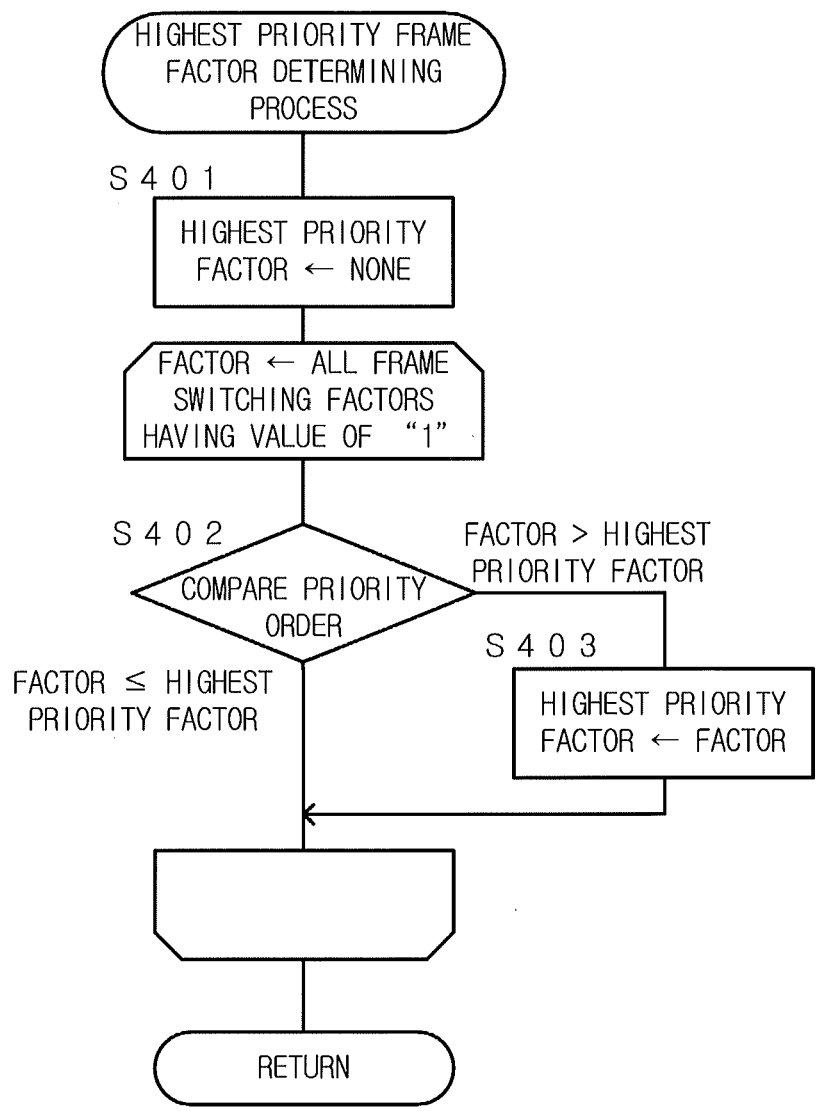
FIG. 23 is a flowchart showing the detail of the highest priority frame factor determining process (Step S103 in FIG. 14)

FIG. 23 shows the detail of the highest priority frame factor determining process (Step S103 in FIG. 14). First, the CPU 11 sets "none" to the variable "highest priority factor" (Step S401). Subsequently, the following processing will be carried out for all the factors having the value of "1" in the frame switching factor table 70. The CPU 11 compares the priority order of the intended factor with the priority order of the factor set to the variable "highest priority factor" (Step S402). At first, it is determined that the priority order of the intended factor is higher than the priority order of the factor (none) set to the variable "highest priority factor".

When the priority order of the intended factor is higher than the priority order of the factor set to the variable "highest priority factor" (Step S402; factor>highest priority factor), the intended factor is set to the variable "highest priority factor". For example, when the intended factor is the ON factor relating to the proximity sensor, "ON factor relating to the proximity sensor" is set to "highest priority factor".

When the priority order of the intended factor is not higher than the priority order of the factor set to the variable "highest priority factor" (Step S402; factor highest priority factor), the next factor is checked.

Figure 24:
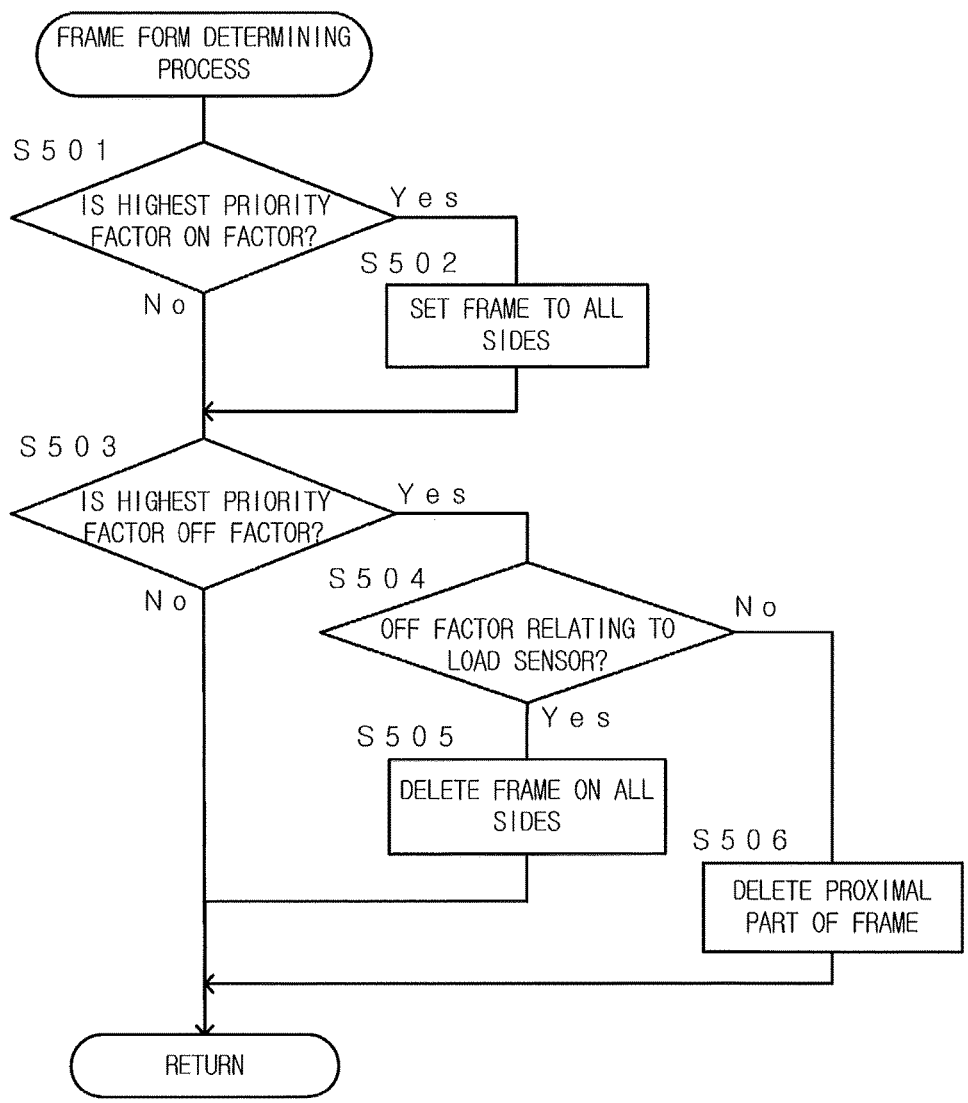
FIG. 24 is a flowchart showing the detail of the frame form determining process.

Next, the frame form determining process is carried out (Step S104 in FIG. 14). FIG. 24 shows the detail of the frame form determining process. First, the CPU 11 determines whether the final highest priority factor determined in the highest priority frame factor determining process is the ON factor (Step S501). In case that the final highest priority factor is the ON factor (Step S501; YES), the whole area of the specific area 30 is set to the non-operable state (the frame area is formed on all of the four sides) (Step S502). When the final highest priority factor is not the ON factor (Step S501; NO), the process proceeds to Step S503.

In case that the final highest priority factor is the OFF factor (Step S503; YES), the CPU 11 determines whether the highest priority factor is the OFF factor relating to the load sensor 18b (Step S504). When the highest priority factor is the OFF factor relating to the load sensor 18b (Step S504; YES), the CPU 11 sets the entire specific area 30 to the operable state (Step S505). In other words, the whole frame arranged on the four sides is deleted (the specific area 30 is set to the operable area).

In case that the final highest priority factor is not the OFF factor relating to the load sensor 18b (Step S504; NO), the CPU 11 sets the part of the specific area 30, which corresponds to the range in which the information processing terminal 10 is in contact with or in close proximity to another information processing terminal 10 or another apparatus, to the operable state, and sets the remaining part of the specific area 30 to the non-operable state (frame area) (Step S506). In other words, the proximal part of the frame is deleted among the four sides of the frame (the above part is set to the operable area).

In case that the final highest priority factor is not the OFF factor (Step S503; NO), the process is ended (Return). In this process, when the highest priority factor is neither the ON factor nor the OFF factor, the current frame form is maintained.

Next, in the frame form switching process (FIG. 14; Step S105), the CPU 11 switches the specific area 30 and the like of the information processing terminal 10 between the operable state and the non-operable state in accordance with the form determined in the process of Step S104, and changes the form of the frame. Then, the process is ended (End).

As described above, according to the information processing terminal 10 of the embodiment, the specific area 30 having the predetermined width is provided so as to be arranged along the circumferential edge of the display face S around the main body, and the specific area 30 can be switched between the operable state where the display of the information and the detection of the touch action are operated and the non-operable state (frame area) where the display of the information and the detection of the touch action are not operated. Accordingly, when the user holds the information processing terminal 10 by the user's hands, it is possible to prevent the erroneous detection caused by the touch action with the fingers of the user, by setting the specific area 30 to the frame area.

Further, when the user does not hold the information processing terminal 10 by the user's hands, the specific area 30 is set to the operable state where the display of the information and the detection of the touch action are operated. Thereby, it is possible to effectively utilize the display face S. Further, the boundary part of the specific area 30, which is arranged in the boundary between the information processing terminal 10 and another operation display apparatus disposed side by side is set to the operable state, and only the other parts of the specific area 30 are set to the non-operable state (frame area). Therefore, it is possible to display a united image having the inconspicuous joint between the information processing terminal 10 and another operation display apparatus disposed side by side in cooperation with another operation display apparatus.

<Modified Example>

When the fingers of the user who holds the information processing terminal 10 by the user's hands protrude into the operable area on the inner side of the display face S from the specific area 30, and the touch action caused by the fingers, which spreads over both of the operable area and the specific area 30, is detected, the width of the frame area on the side where the fingers reach the operable area may be broadened so as to prevent the fingers from reaching the operable area. Accordingly, the fingers do not cover the operable area. Further, because the user recognizes that the detection of the touch action is not operated in the frame area, the user intuitively recognizes that the erroneous operation is prevented.

As described above, the embodiment and the modified example are explained by using the drawings. However, in the present invention, the concrete configuration is not limited to the above embodiment and the like. In the present invention, various modifications of the above embodiment and the like or the addition of various functions or the like to the embodiment and the like can be carried out without departing from the gist of the invention.

In the embodiment, the specific area 30 is provided so as to be arranged along the circumferential edge of the display face S around the main body. However, the specific area 30 may be provided only on a part of the circumferential edge. The specific area 30 may be provided on one side or two sides among four sides of the frame, which are arranged on the upper end, the lower end, the right end and the left end. For example, when the information processing terminal 10 has the shape in which the way of holding the information processing terminal 10 by the user is limited to a specific way of holding the information processing terminal 10, the specific area may be provided on only the portions of the information processing terminal 10, which the user potentially holds by the user's hand. The specific area may be provided on an optional portion of the display face S or the specific area may be provided on the portion except the end edge of the information processing terminal 10.

In the embodiment, the end edge (circumferential edge) of the face of the main body of the information processing terminal 10 is configured so as to be coincident with or be approximately coincident with the end edge (circumferential edge) of the display face S. Further, in the portion in which the end edge of the face of the main body is coincident with or is approximately coincident with the end edge of the display face S (the portion in which the frame having not less than the predetermined width (for example, 3 cm) is not provided on the outer side of the end edge of the display face S), the specific area is provided along the end edge of the display face S. However, the frame having not less than the predetermined width may be provided as a part of the main body between the end edge (circumferential edge) of the face of the main body of the information processing terminal 10 and the end edge of the display face S. For example, the case in which the above frame is provided around the end edge of the display face S or on a part of the end edge of the display face S in view of the strength of the information processing terminal 10, is not excluded.

In the embodiment, the information processing terminal 10 detects whether the user holds the information processing terminal 10 by the user's hands, by using the load sensor 18b. However, by using another optional sensor, the information processing terminal 10 detects whether the user holds the information processing terminal 10 by the user's hands.

In the embodiment, the proximity sensors 18a finely detect the length or the position of the part which is in contact with or in close proximity to another apparatus disposed side by side. However, for example, a sensor for detecting the side which is in contact with or in close proximity to another apparatus with respect to each side of the information processing terminal 10, may be used.

One of the objects of the above embodiment is to provide an operation display apparatus, an operation display method and a tangible computer-readable recording medium which can suitably set the display area and the touch action detecting area in accordance with the usage situation of the apparatus.

In the above embodiment, the specific area which is a part of the display face is switched between the operable state in which the display of the information and the detection of the touch action for the touch panel are operated and the non-operable state in which the above display and the above detection are not operated. By switching the specific area between the operable state and the non-operable state, the area in which the above display and the above detection are operated can be changed in accordance with the usage situation of the apparatus.

In the above embodiment, in case that the information is displayed in cooperation with another operation display apparatus disposed with the operation display apparatus side by side, the boundary part of the specific area, which is arranged in the boundary between the operation display apparatus and another operation display apparatus disposed side by side, is set to the operable state. As a result, it is possible to improve the continuity of the information.

In the above embodiment, in case that the information is displayed in cooperation with another operation display apparatus disposed side by side, the range in which the operation display apparatus is in contact with or in close proximity to another operation display apparatus is detected. Further, in accordance with the detected range, a range in which the specific area is set to the operable state is changed.

In the above embodiment, for example, when the operation display apparatus is held by a user's hand, the specific area is provided in a portion which the fingers of the holding hand can reach.

In the above embodiment, when it is detected that the operation display apparatus is held by the user's hand, the specific area is set to the non-operable state. The user can securely uses the operation display apparatus by treating the specific area set to the non-operable state as a handle of the operation display apparatus.

In the above embodiment, by setting the specific area to the non-operable state, the power consumption of the operation display apparatus can be reduced. For example, when the backlights disposed in the portion set to the non-operable state are turned off in a liquid crystal display, the power can be saved.

In the above embodiment, by setting the specific area to the non-operable state, the exhaustion of the battery can be suppressed.

In the above embodiment, in the situation in which the specific area is set to the non-operable state, when the instruction for setting the rest of the display area to the non-operable state are received from a user, the user intends to turn off the entire display face of the display unit. Accordingly, when the above operation is received, the operation display apparatus is turned off, or is set to the standby mode.

According to the operation display apparatus, the operation display method and the tangible computer-readable recording medium, the display area and the touch action detecting area can be suitably set in accordance with the usage situation of the apparatus.

The present U.S. patent application claims the priority of Japanese Patent Application No. 2012-99552, filed on Apr. 25, 2012, according to the Paris Convention, and the above Japanese Patent Application is the basis for correcting mistranslation of the present U.S. patent application.

What is claimed is:

1. An operation display apparatus comprising:
a display device;
a touch panel configured to detect touch operation in which a display face of the display device is touched; and
a hardware processor configured to:
control display contents of the display device,
switch a specific area provided in a part of the display face between a first state in which a display on the display device is performed and touch operation is detected on the touch panel and a second state in which a display on the display device is not performed and touch operation is not detected on the touch panel, and in response to arranging another operation display apparatus adjacent to the operation display apparatus, set a first part of the specific area, the first part being a boundary part with the other operation display apparatus arranged adjacent to the operation display apparatus, to the first state, and set a second part which is other than the first part of the specific area to the second state.

2. The operation display apparatus of claim 1, further comprising a proximity sensor to detect a range in which the operation display apparatus is in contact with or in close proximity to the another operation display apparatus disposed side by side, wherein the hardware processor sets a part of the specific area, which corresponds to the range detected by the proximity sensor, to the first state.

3. The operation display apparatus of claim 1, wherein in a portion in which a frame having not less than a predetermined width is not provided in an outer side of an end edge of the display face of the display device, the specific area is provided along the end edge of the display face.

4. The operation display apparatus of claim 3, further comprising a holding hand detecting unit to detect whether the operation display apparatus is held by a user's hand, wherein when the holding hand detecting unit detects that the operation display apparatus is held by the user's hand, the hardware processor sets the specific area to the second state.

5. The operation display apparatus of claim 1, wherein the specific area is provided along an end edge of the display face so as to surround a central portion of the display face.

6. The operation display apparatus of claim 1, wherein the hardware processor switches the specific area between the first state and the second state, in accordance with a user's instruction.

7. The operation display apparatus of claim 1, wherein when a power mode of the operation display apparatus is a power saving mode, the hardware processor sets the specific area to the second state.

8. The operation display apparatus of claim 1, wherein when residual quantity of a battery to supply electric power to the operation display apparatus is lower than a predetermined amount, the hardware processor sets the specific area to the second state.

9. The operation display apparatus of claim 1, wherein in a situation in which the hardware processor sets the specific area to the second state, when an instruction for setting a remaining area of the display face except the specific area to the second state is received from a user, the hardware processor turns off the operation display apparatus or sets the operation display apparatus to a standby mode in which the display of the information, which is performed by the display device is turned off.

10. An operation display method comprising:
detecting touch operation in which a display face of a display device of an operation display apparatus is touched; and
controlling display contents of the display device and switching a specific area provided in a part of the display face between a first state in which a display on the display device is performed and touch operation is detected on the display face and a second state in which a display on the display device is not performed and touch operation is not detected on the display face,
wherein in response to arranging another operation display apparatus adjacent to the operation display apparatus, the first part being a boundary part with the other operation display apparatus arranged adjacent to the operation display apparatus, is set to the first state, and a second part which is other than the first part of the specific area, is set to the second state.

11. The operation display method of claim 10, further comprising detecting a range in which the operation display apparatus is in contact with or in close proximity to the another operation display apparatus disposed side by side,
wherein in the controlling and the switching, a part of the specific area, which corresponds to the detected range, is set to the first state.

12. The operation display method of claim 10, wherein in a portion in which a frame having not less than a predetermined width is not provided in an outer side of an end edge of the display face of the display device, the specific area is provided along the end edge of the display face.

13. The operation display method of claim 12, further comprising detecting whether the operation display apparatus is held by a user's hand,
wherein when it is detected that the operation display apparatus is held by the user's hand, the specific area is set to the second state in the controlling and the switching.

14. The operation display method of claim 10, wherein the specific area is provided along an end edge of the display face so as to surround a central portion of the display face.

15. A tangible, non-transitory computer-readable recording medium storing a program, wherein the program causes an operation display apparatus to execute:
detecting touch operation in which a display face of a display device of the operation display apparatus is touched; and
controlling display contents of the display device and switching a specific area provided in a part of the display face between a first state in which a display on the display device is performed and touch operation is detected on the display face and a second state in which a display on the display device is not performed and touch operation is not detected on the display face,
wherein in response to arranging another operation display apparatus adjacent to the operation display apparatus, a first part of the specific area, the first part being a boundary part with the other operation display apparatus arranged adjacent to the operation display apparatus, is set to the first state, and a second part which is other than the first part of the specific area, is set to the second state.

16. The tangible, non-transitory computer-readable recording medium of claim 15, wherein the program causes the operation display apparatus to further execute detecting a range in which the operation display apparatus is in contact with or in close proximity to the another operation display apparatus disposed side by side,
wherein in the controlling and the switching, a part of the specific area, which corresponds to the detected range, is set to the first state.

17. The tangible, non-transitory computer-readable recording medium of claim 15, wherein in a portion in which a frame having not less than a predetermined width is not provided in an outer side of an end edge of the display face of the display device, the specific area is provided along the end edge of the display face.

18. The tangible, non-transitory computer-readable recording medium of claim 17, wherein the program causes the operation display apparatus to further execute detecting whether the operation display apparatus is held by a user's hand, wherein when it is detected that the operation display apparatus is held by the user's hand, the specific area is set to the second state in the controlling and the switching.

19. The tangible, non-transitory computer-readable recording medium of claim 15, wherein the specific area is provided along an end edge of the display face so as to surround a central portion of the display face.

\* \* \* \* \*